United States Patent

Yamada et al.

[11] Patent Number: 5,804,934
[45] Date of Patent: Sep. 8, 1998

[54] POWER OUTPUT APPARATUS AND METHOD OF CONTROLLING THE SAME

[75] Inventors: Eiji Yamada, Owariasahi; Takao Miyatani, Toyota; Yasutomo Kawabata, Aichi-ken; Ryouji Mizutani, Aichi-ken; Yoshiaki Taga, Aichi-ken, all of Japan

[73] Assignee: Toyota Jidosha Kabushiki Kaisha, Toyota, Japan

[21] Appl. No.: 644,261

[22] Filed: May 10, 1996

[30] Foreign Application Priority Data

May 19, 1995 [JP] Japan .................................... 7-145575
Aug. 9, 1995 [JP] Japan .................................... 7-225869

[51] Int. Cl.[6] ...................................................... H02P 5/46
[52] U.S. Cl. ..................................... 318/77; 318/8; 318/9; 318/7; 318/34; 318/48; 318/51; 318/52; 60/698; 60/699; 60/700
[58] Field of Search .................................. 318/77, 8, 9, 7, 318/34, 48, 51, 52; 60/698–700, 711

[56] References Cited

U.S. PATENT DOCUMENTS

| | | |
|---|---|---|
| 3,683,249 | 8/1972 | Shibata . |
| 3,789,281 | 1/1974 | Shibata . |
| 4,335,429 | 6/1982 | Kawakatsu ................................ 364/424 |
| 5,199,391 | 4/1993 | Kovalenko ............................. 60/698 X |
| 5,237,230 | 8/1993 | Sugiyama et al. .................... 318/77 X |
| 5,310,387 | 5/1994 | Savagian ................................... 318/34 |
| 5,372,107 | 12/1994 | Smythe .................................. 318/77 X |
| 5,433,179 | 7/1995 | Wittry .................................... 318/77 X |
| 5,512,022 | 4/1996 | Suzuki ......................................... 475/2 |
| 5,513,719 | 5/1996 | Moroto et al. ......................... 60/698 X |
| 5,561,975 | 10/1996 | Gambini ................................. 60/698 X |
| 5,601,257 | 2/1997 | McKann ................................. 60/698 X |

FOREIGN PATENT DOCUMENTS

| | | |
|---|---|---|
| 58401/73 | 1/1975 | Australia . |
| 0 725 474 | 8/1996 | European Pat. Off. . |
| 28 23 225 A1 | 11/1979 | Germany . |
| 29 28 770 A1 | 1/1981 | Germany . |
| 30 25 756 A1 | 1/1982 | Germany . |
| 49-43311 | 4/1974 | Japan . |
| 51-22132 | 7/1976 | Japan . |
| 53-133814 | 11/1978 | Japan . |
| 55-103100 | 8/1980 | Japan . |
| 1193965 | 6/1970 | United Kingdom . |
| WO 89/04081 | 5/1989 | WIPO . |

*Primary Examiner*—Karen Masih
*Attorney, Agent, or Firm*—Oliff & Berridge, PLC

[57] ABSTRACT

A power output apparatus (20) of the present invention includes a clutch motor (30), an assist motor (40), and a controller (80) for controlling the clutch motor (30) and the assist motor (40). The clutch motor (30) includes an outer rotor (32) linked with a crankshaft (56) of a gasoline engine (50) and an inner rotor (34) connecting with a drive shaft (22). The assist motor (40) includes a rotor (42) connecting with the drive shaft (22). An electric current flowing through three-phase coils (36) in the clutch motor (30) enables the outer rotor (32) to be coupled with the inner rotor (34) with a certain slip. Electrical energy corresponding to the certain slip is recovered as an electric power via a first driving circuit (91). The assist motor (40) is controlled with the electric power via a second driving circuit (92) so as to apply a torque to the drive shaft (22). The power output apparatus (20) of the invention can transmit the power generated by the gasoline engine (50) to the drive shaft (22) at a high efficiency and produce a torque in the direction of rotation of the crankshaft (56).

26 Claims, 24 Drawing Sheets

POWER OUTPUT APPARATUS AND METHOD OF CONTROLLING THE SAME

BACKGROUND OF THE INVENTION

1. Field of the Invention

The present invention relates to a power output apparatus and a method of controlling the same. More specifically, the invention pertains to a power output apparatus for transmitting or utilizing a power generated by an engine at a high efficiency as well as a method of controlling such a power output apparatus.

2. Description of the Prior Art

Torque converters utilizing a fluid are generally used to convert an output torque of an engine or the like to power and transmit the converted power. In the conventional fluid-based torque converters, an input shaft and an output shaft are not fully locked with each other and there is accordingly an energy loss corresponding to a slip occurring between the input shaft and the output shaft. The energy loss, which is consumed as a heat, is expressed as the product of the revolving speed difference between the input shaft and the output shaft and the torque transmitted at that time. In vehicles with such a torque converter mounted thereon, a large energy loss occurs in transient state like a starting time. The efficiency of power transmission is not 100% even in stationary driving. Compared with manual transmissions, the torque converters lead to a lower fuel consumption.

Proposed power output apparatuses do not use a fluid for torque conversion or power transmission unlike the conventional torque converters, but transmit a power through mechanical-electrical-mechanical conversion. For example, a power output apparatus disclosed in JAPANESE PATENT PUBLICATION GAZETTE No. 51-22132 couples an output of an engine with power transmission means including an electromagnetic coupling and a revolving armature and realizes a reduction ratio (ratio of torque conversion) of 1+P2/P1, wherein P1 and P2 respectively denote the number of poles in the revolving armature and the number of poles in the electromagnetic coupling.

Another power output apparatus disclosed in JAPANESE PATENT LAYING-OPEN GAZETTE No. 53-133814 couples an output shaft of an engine with a rotating shaft of a d.c. motor via an electromagnetic coupling to make the rotating shaft work as a drive shaft. The engine drives one rotor on the side of d.c. field winding of the electromagnetic coupling, while the other rotor on the side of a.c. armature winding drives the rotating shaft of the d.c. motor or the drive shaft. Electric power produced by a slip between the two rotors of the electromagnetic coupling is supplied from the rotor on the side of a.c. armature winding to the d.c. motor via a rectifier. The d.c. motor also receives electric power from a battery to rotate the drive shaft.

Unlike the conventional fluid-based torque converters, these two proposed power output apparatuses have no energy loss corresponding to the slip. It is accordingly possible to make the energy loss in the power transmission means relatively small by enhancing the efficiency of the electromagnetic coupling and the revolving armature or the d.c. motor.

The former power output apparatus, however, has a fixed ratio of torque conversion and is thus not applicable to vehicles or other mechanisms requiring a wide variation in conversion ratio. This system can not realize a desired conversion ratio according to the driving conditions of the vehicle and the engine.

The latter power output apparatus simply regulates the exciting current flowing through the field winding of the electromagnetic coupling and does not carry out any minute control. This system is thus not suitable for the accurate control according to the driving conditions of the vehicle and the engine.

As discussed previously, fluid-based systems can not be free from the energy loss corresponding to the slip between the input shaft and the output shaft.

SUMMARY OF THE INVENTION

The object of the present invention is thus to provide a power output apparatus which can transmit or utilize a power from an engine at a high efficiency and output a torque in the direction of rotation of an output shaft of the engine, and also to provide a method of controlling such a power output apparatus.

At least part of the above object is realized by a first power output apparatus for outputting power to a drive shaft.

The first power output apparatus includes an engine having an output shaft; a first motor comprising a first rotor connected with the output shaft of the engine and a second rotor connected with the drive shaft. The second rotor is coaxial to and rotatable relative to the first rotor. The first and second rotors are electromagnetically coupled with each other, whereby power is transmitted between the output shaft of the engine and the drive shaft via the electromagnetic coupling of the first and second rotors. First motor-driving means exchange electric currents with the first motor to vary the electromagnetic coupling of the first rotor with the second rotor. A second motor includes a stator and a third rotor connected with either one of the drive shaft and the output shaft of the engine, the stator being electromagnetically coupled with the third rotor; second motor-driving means for exchanging electric currents with the second motor to vary the electromagnetic coupling of the stator with the third rotor; and control means for controlling the first motor-driving means to enable the first motor to regenerate electric power, and controlling the second motor-driving means to supply the regenerated electric power to the second motor to drive the second motor.

In the first power output apparatus of the invention, electric energy is shifted from the first motor to the second motor by supplying the electric power regenerated by the first motor to the second motor. The second motor then applies an additional torque to the drive shaft. This structure does not cause energy loss when the engine is driven at a stationary revolving speed. The torque conversion principle of the first power output apparatus realizes any desirable torque condition, from an output of high torque at a low revolving speed to an output of low torque at a high revolving speed.

In the first power output apparatus of the invention, is part of the energy generated by the engine is directly output as a torque, while another part acting as a slip in the first motor is converted to an electric power. The second motor is then driven with the regenerated electric power. The first power output apparatus can transmit the power at a high efficiency and realize a desired torque conversion.

In accordance with one aspect of the invention, a second power output apparatus for outputting power to a drive shaft includes an engine having an output shaft; a first motor comprising a first rotor connected with the output shaft of the engine and a second rotor connected with the drive shaft. The second rotor is coaxial to and rotatable relative to the first rotor. The first and second rotors are electromagnetically coupled with each other, whereby power is transmitted between the output shaft of the engine and the drive shaft via the electromagnetic coupling of the first and second rotors. First motor-driving means exchange electric currents with the first motor to vary the electromagnetic coupling of the first rotor with the second rotor. A second motor includes a stator and a third rotor connected with either one of the drive shaft and the output shaft of the engine, the stator being electromagnetically coupled with the third rotor; second motor-driving means for exchanging electric currents with the second motor to vary the electromagnetic coupling of the stator with the third rotor; and control means for controlling the first motor-driving means to enable the first motor to regenerate electric power, and controlling the second motor-driving means to enable the second motor to regenerate electric power.

The second power output apparatus of the invention can generate a power greater than the generation capacity of the first motor and is thus preferably applied for cases requiring a large amount of electric power.

In accordance with another aspect of the invention, a third power output apparatus for outputting mechanical energy as power to a drive shaft includes an engine connected with a rotating shaft; a first motor connected with the rotating shaft; and a second motor connected with the drive shaft. The engine produces mechanical energy and transmits the mechanical energy to the rotating shaft. The first motor converts part of the mechanical energy transmitted via the rotating shaft to electrical energy and transmits the remainder of the mechanical energy to the second motor. The second motor converts part of the remaining mechanical energy transmitted from the first motor to electrical energy and outputs the remainder of the mechanical energy to the drive shaft.

The third power output apparatus of the invention can transmit and utilize the mechanical energy generated by the engine at a high efficiency and is preferably applied to cases requiring a large amount of electric power.

In accordance with still another aspect of the invention, a fourth power output apparatus for outputting power to a drive shaft includes an engine having an output shaft and applying the first torque to the output shaft; a motor comprising a first rotor connected with the output shaft of the engine and a second rotor connected with the drive shaft. The second rotor is coaxial to and rotatable relative to the first rotor. The first and second rotors are electromagnetically coupled with each other, whereby power is transmitted between the output shaft of the engine and the drive shaft via the electromagnetic coupling of the first and second rotors. Motor-driving means exchange electric currents with the first motor to vary the electromagnetic coupling of the first rotor with the second rotor. A control means for controlling the motor-driving means to enable the motor to apply a second torque, which is greater than the first torque and acts in the reverse of the first torque, to the output shaft of the engine.

In the fourth power output apparatus of the invention, the control means controls the motor-driving means to enable the motor to apply a second torque, which is greater than the first torque produced by the engine and acts in the reverse of the first torque, to the output shaft of the engine. The total torque applied to the output shaft of the engine accordingly acts in the reverse of rotation of the output shaft of the engine. This means that an acceleration in the reverse of its rotation (that is, deceleration) is applied to the output shaft of the engine. The revolving speed of the output shaft of the engine consequently decreases. The energy of rotational motion of the engine output shaft is proportional to the second power of the revolving speed of the engine output shaft, and thus decreases with the decrease in revolving speed. As described previously, the motor is controlled to apply a second torque, which is greater than the first torque produced by the engine and acts in the reverse of the first torque, to the output shaft of the engine. As a reaction, the drive shaft linked with the second rotor of the motor receives a torque, which is greater than the torque produced by the engine and acts in the same direction as the engine torque.

In the manner discussed above, the fourth power output apparatus of the invention utilizes the energy of rotational motion of the engine output shaft to produce a torque, which is greater than the torque produced by the engine and acts in the same direction as the engine torque, on the drive shaft.

In accordance with another aspect of the invention, a fifth power output apparatus for outputting power to a drive shaft includes an engine having an output shaft and applying the first torque to the output shaft; a first motor comprising a first rotor connected with the output shaft of the engine and a second rotor connected with the drive shaft. The second rotor is coaxial to and rotatable relative to the first rotor. The first and second rotors are electromagnetically coupled with each other, whereby power is transmitted between the output shaft of the engine and the drive shaft via the electromagnetic coupling of the first and second rotors. Motor-driving means exchange electric currents with the first motor to vary the electromagnetic coupling of the first rotor with the second rotor. A second motor includes a stator and a third rotor connected with the output shaft of the engine, the second motor applying the second torque to the output shaft. A controller controls the motor-driving means to enable the first motor to apply a third torque, which is greater than the sum of the first torque and the second torque and acts in the reverse of the first torque, to the output shaft of the engine.

In the fifth power output apparatus of the invention, the third rotor of the second motor is linked with the output shaft of the engine. The control means controls the motor-driving means to enable the first motor to apply a third torque, which is greater than the sum of the first torque produced by the engine and the second torque produced by the second motor and acts in the reverse of the first torque, to the output shaft of the engine. The total torque applied to the output shaft of the engine accordingly acts in the reverse of rotation of the output shaft of the engine. A deceleration is thus applied to the output shaft of the engine, which decreases the revolving speed and thereby the energy of rotational motion of the output shaft of the engine. As described previously, the first motor is controlled to apply a third torque, which is greater than the sum of the first torque produced by the engine and the second torque produced by the second motor and acts in the reverse of the first torque, to the output shaft of the engine. As a reaction, the drive shaft linked with the second rotor of the first motor receives a torque, which is greater than the sum of the torques produced by the engine and the second motor and acts in the same direction as the engine torque.

In the manner discussed above, the fifth power output apparatus of the invention utilizes the energy of rotational motion of the engine output shaft to produce a torque, which is greater than the sum of the torques produced by the engine and the second motor and acts in the same direction as the engine torque, on the drive shaft.

In accordance with still another aspect of the invention, a sixth power output apparatus for outputting power to a drive shaft includes an engine having an output shaft; a motor comprising a first rotor connected with the output shaft of the engine and a second rotor connected with the drive shaft. The second rotor is coaxial to and rotatable relative to the first rotor. The first and second rotors are electromagnetically coupled with each other, whereby power is transmitted between the output shaft of the engine and the drive shaft via the electromagnetic coupling of the first and second rotors. Motor-driving means exchange electric currents with the first motor to vary the electromagnetic coupling of the first rotor with the second rotor. A controller controls the motor-driving means to enable the motor to apply a torque, in order to decrease energy of rotational motion of the output shaft of the engine, to the output shaft.

The drive shaft consequently receives a torque, which is greater than the torque produced by the engine and acts in the same direction as the engine torque.

Like the fourth power output apparatus discussed above, the sixth power output apparatus of the invention utilizes the energy of rotational motion of the engine output shaft to produce a torque, which is greater than the torque produced by the engine and acts in the same direction as the engine torque, on the drive shaft.

In accordance with another aspect of the invention, a seventh power output apparatus for outputting power to a drive shaft comprising an engine having an output shaft; a motor comprising a first rotor connected with the output shaft of the engine and a second rotor connected with the drive shaft. The second rotor is coaxial to and rotatable relative to the first rotor. The first and second rotors are electromagnetically coupled with each other, whereby power is transmitted between the output shaft of the engine and the drive shaft via the electromagnetic coupling of the first and second rotors. Motor-driving means exchange electric currents with the first motor to vary the electromagnetic coupling of the first rotor with the second rotor. A controller controls the motor-driving means to enable the motor to apply a torque, in order to make a sum of torques applied to the output shaft of the engine act in the reverse of rotation of the output shaft, to the output shaft.

This control accordingly decreases the revolving speed and thereby the energy of rotational motion of the output shaft of the engine. Like the fourth power output apparatus discussed above, the seventh power output apparatus of the invention can also produce a torque, which is greater than the torque produced by the engine and acts in the same direction as the engine torque, on the drive shaft linked with the second rotor of the motor.

In accordance with another aspect of the invention, a eighth power output apparatus for outputting power to a drive shaft comprising an engine having an output shaft; a motor comprising a first rotor connected with the output shaft of the engine and a second rotor connected with the drive shaft. The second rotor is coaxial to and rotatable relative to the first rotor. The first and second rotors are electromagnetically coupled with each other, whereby power is transmitted between the output shaft of the engine and the drive shaft via the electromagnetic coupling of the first and second rotors. Motor-driving means for exchange electric currents with the first motor to vary the electromagnetic coupling of the first rotor with the second rotor. A controller controls the motor-driving means to enable the motor to apply a torque, in order to decrease a revolving speed of the output shaft of the engine, to the output shaft.

This control accordingly decreases the energy of rotational motion of the engine output shaft. Like the fourth power output apparatus discussed above, the eighth power output apparatus of the invention can also produce a torque, which is greater than the torque produced by the engine and acts in the same direction as the engine torque, on the drive shaft linked with the second rotor of the motor.

The invention is also directed to a first method of controlling a power output apparatus for outputting power to a drive shaft.

The power output apparatus includes an engine having an output shaft; a first motor comprising a first rotor connected with the output shaft of the engine and a second rotor connected with the drive shaft. The second rotor is coaxial to and rotatable relative to the first rotor. The first and second rotors is electromagnetically coupled with each other, whereby power is transmitted between the output shaft of the engine and the drive shaft via the electromagnetic coupling of the first and second rotors. A second motor includes a stator and a third rotor connected with the drive shaft, the stator being electromagnetically coupled with the third rotor. The first method includes regenerating electric power with the first motor and supplying the regenerated electric power to the second motor to drive the second motor.

The invention is further directed to a second method of controlling a power output apparatus for outputting power to a drive shaft. The power output apparatus includes an engine having an output shaft; a first motor comprising a first rotor connected with the output shaft of the engine and a second rotor connected with the drive shaft. The second rotor being coaxial to and rotatable relative to the first rotor. The first and second rotors are electromagnetically coupled with each other, whereby power is transmitted between the output shaft of the engine and the drive shaft via the electromagnetic coupling of the first and second rotors. A second motor includes a stator and a third rotor connected with the drive shaft, the stator being electromagnetically coupled with the third rotor. The second method includes regenerating electric power with both the first and second motors.

The invention is still further directed to a third method of controlling a power output apparatus for outputting power to a drive shaft. The power output apparatus includes an engine having an output shaft and a motor comprising a first rotor connected with the output shaft of the engine and a second rotor connected with the drive shaft. The second rotor is coaxial to and rotatable relative to the first rotor. The first and second rotors are electromagnetically coupled with each other, whereby power is transmitted between the output shaft of the engine and the drive shaft via the electromagnetic coupling of the first and second rotors. The method includes operating the engine to apply a first torque to the output shaft, and applying a second torque, which is greater than the first torque and acts in the reverse of the first torque, to the output shaft of the engine.

These and other objects, features, aspects, and advantages of the present invention will become more apparent from the following detailed description of the preferred embodiments with the accompanying drawings.

DETAILED DESCRIPTION OF PREFERRED EMBODIMENTS

Figure 1:
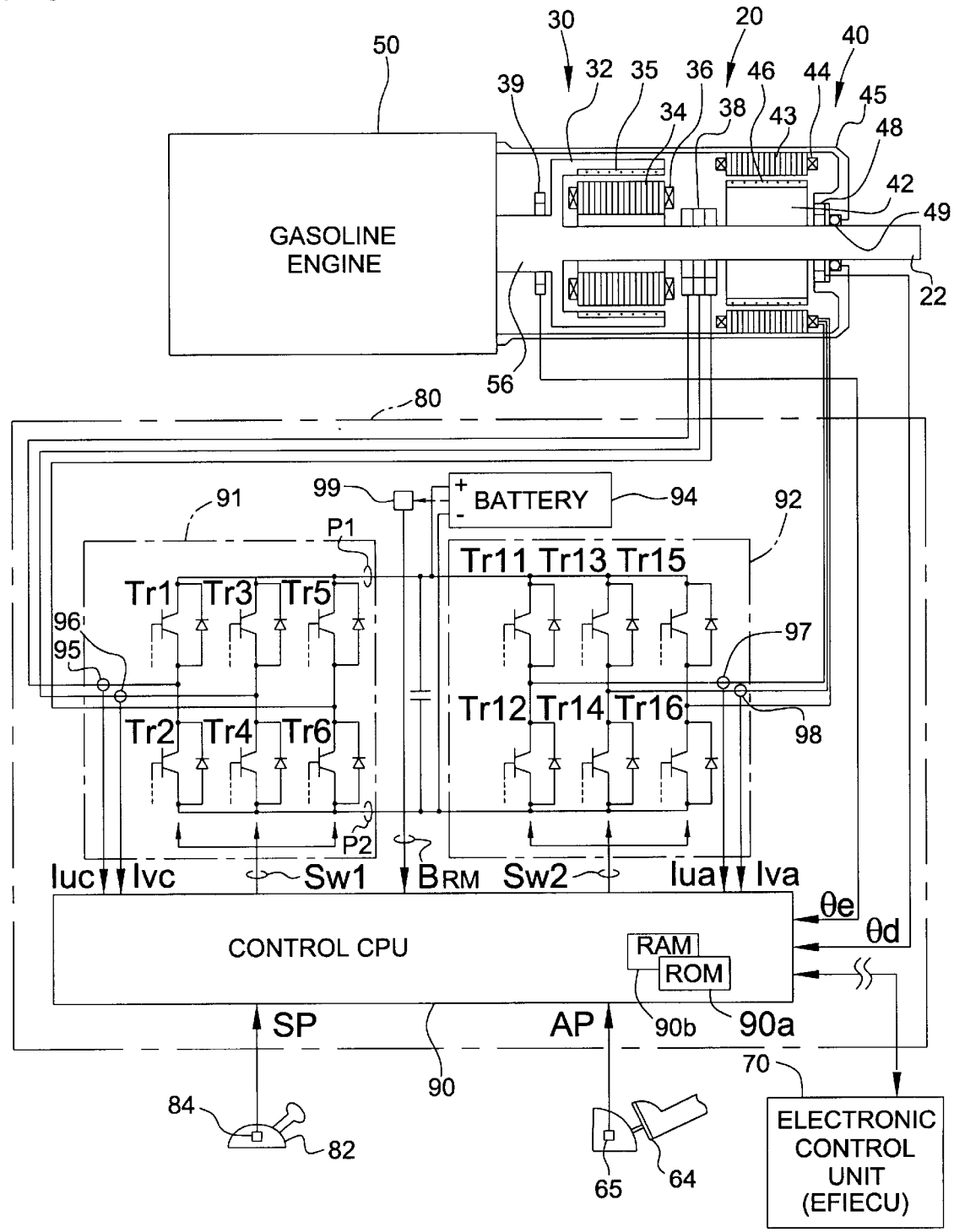
FIG. 1 schematically illustrates structure of a power output apparatus 20 as a first embodiment according to the present invention.
Figure 2:
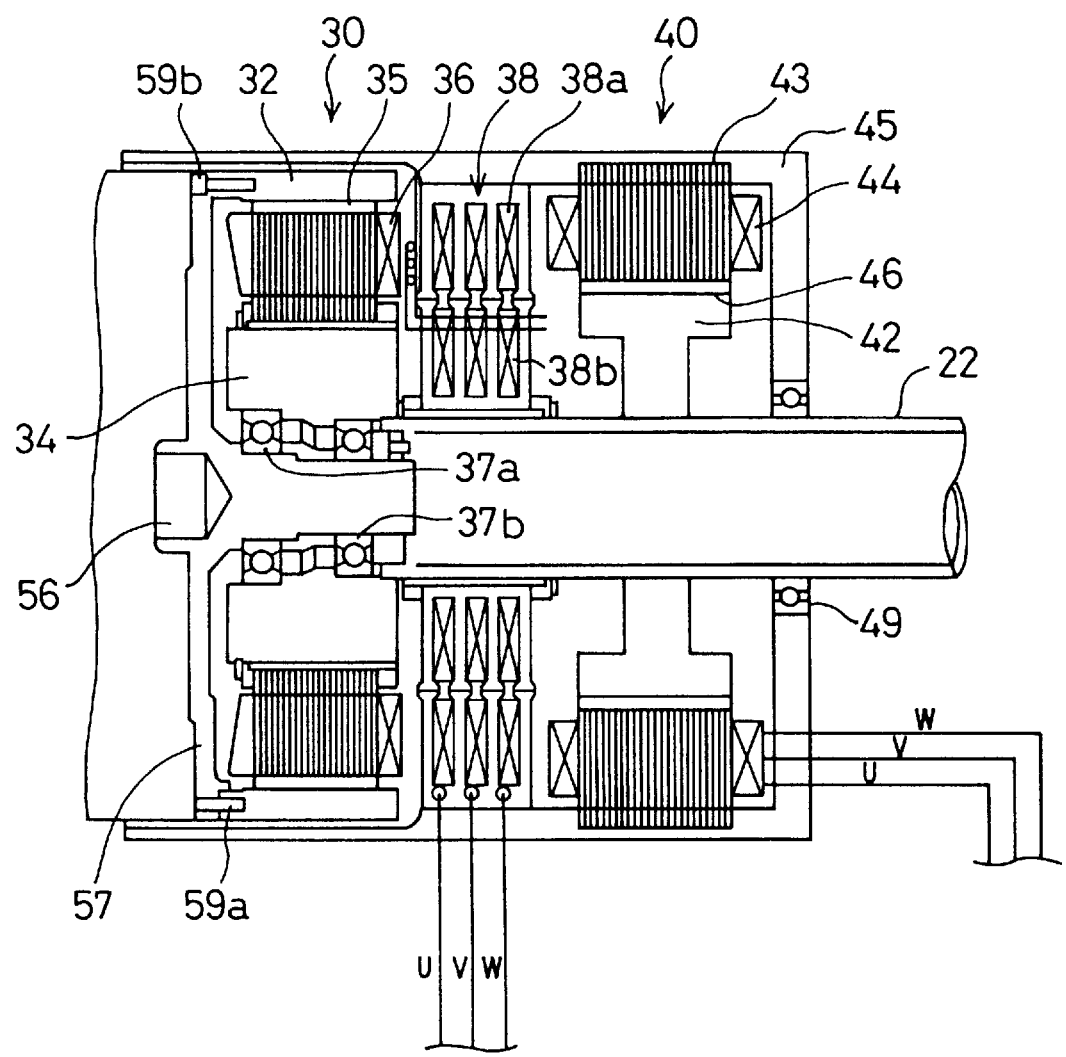
FIG. 2 is a cross sectional view illustrating detailed structures of a clutch motor 30 and an assist motor 40 included in the power output apparatus 20 of FIG. 1.
Figure 3:
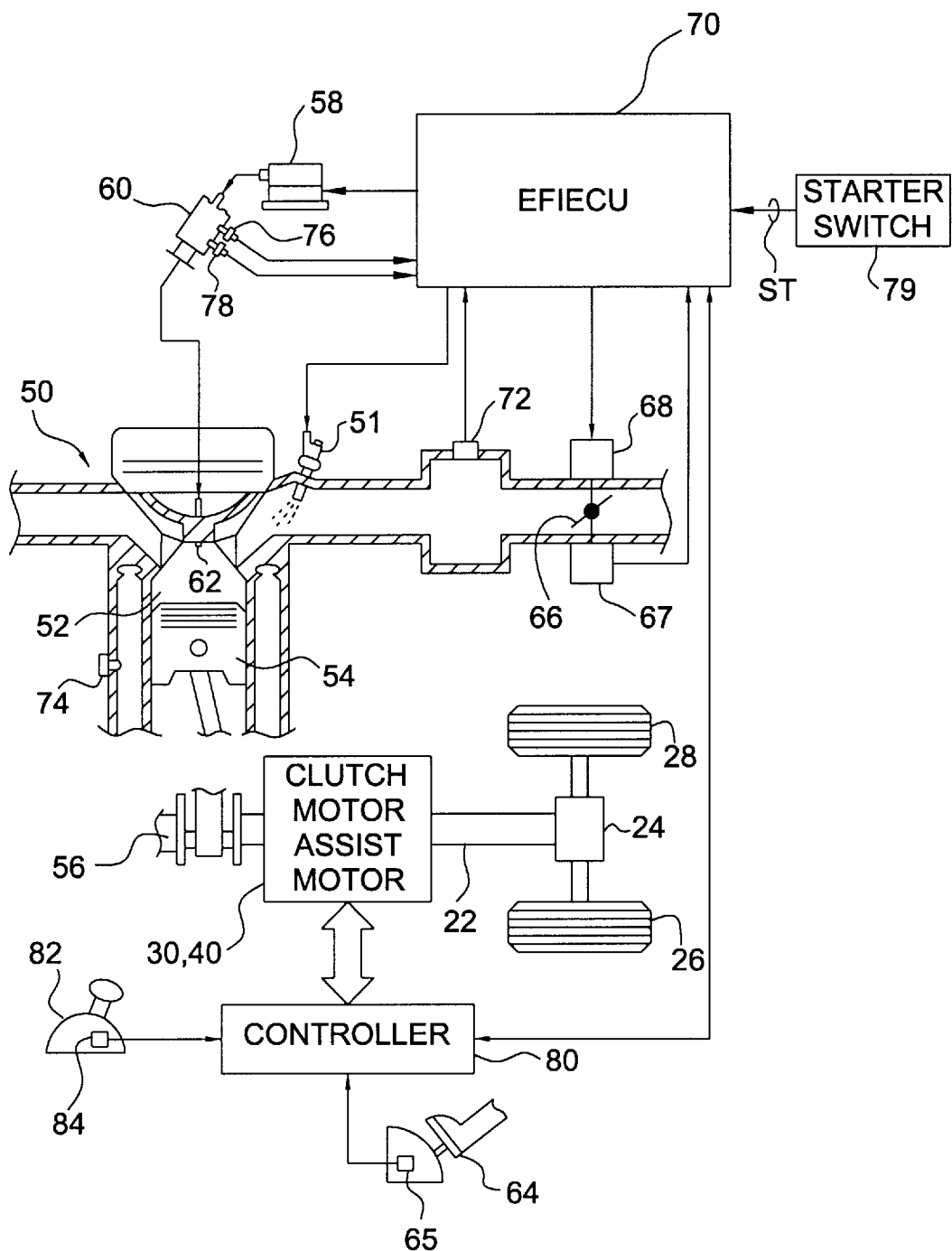
FIG. 3 is a schematic view illustrating general structure of a vehicle with the power output apparatus 20 of FIG. 1 incorporated therein.

FIG. 1 is a schematic view illustrating structure of a power output apparatus 20 as a first embodiment according to the present invention; FIG. 2 is a cross sectional view illustrating detailed structures of a clutch motor 30 and an assist motor 40 included in the power output apparatus 20 of FIG. 1; and FIG. 3 is a schematic view illustrating general structure of a vehicle with the power output apparatus 20 of FIG. 1 incorporated therein. The general structure of the vehicle is described first as a matter of convenience.

Referring to FIG. 3, the vehicle has a gasoline engine 50 driven by gasoline as a power source or a prime mover. The air ingested from an air supply system via a throttle valve 66 is mixed with fuel, that is, gasoline in this embodiment, injected from a fuel injection valve 51. The air/fuel mixture is supplied into a combustion chamber 52 to be explosively ignited and burned. Linear motion of a piston 54 pressed down by the explosion of the air/fuel mixture is converted to rotational motion of a crankshaft 56. The throttle valve 66 is driven to open and close by a motor 68. An ignition plug 62 converts a high voltage applied from an igniter 58 via a distributor 60 to a spark, which explosively ignites and combusts the air/fuel mixture.

Operation of the gasoline engine 50 is controlled by an electronic control unit (hereinafter referred to as EFIECU) 70. The EFIECU 70 receives information from various sensors, which detect operating conditions of the gasoline engine 50. These sensors include a throttle position sensor 67 for detecting the valve travel or the position of the throttle valve 66, a manifold vacuum sensor 72 for measuring a load applied to the gasoline engine 50, a water temperature sensor 74 for measuring the temperature of cooling water in the gasoline engine 50, and a speed sensor 76 and an angle sensor 78 mounted on the distributor 60 for measuring the revolving speed and rotational angle of the crankshaft 56. A starter switch 79 for detecting a starting condition ST of an ignition key (not shown) is also connected to the EFIECU 70. Other sensors and switches connecting with the EFIECU 70 are omitted from the drawings.

The crankshaft 56 of the gasoline engine 50 is linked with a drive shaft 22 via a clutch motor 30 and an assist motor 40. The drive shaft 22 further connects with a differential gear 24, which eventually transmits the torque output from the drive shaft 22 to left and right driving wheels 26 and 28. The clutch motor 30 and the assist motor 40 are driven and controlled by a controller 80. The controller 80 includes an internal control CPU and receives inputs from a gearshift position sensor 84 attached to a gearshift 82 and an accelerator position sensor 65 attached to an accelerator pedal 64, as described later in detail. The controller 80 sends and receives a variety of data and information to and from the EFIECU 70 through communication. Details of the control procedure including a communication protocol will be described later.

Referring to FIG. 1, the power output apparatus 20 essentially includes the gasoline engine 50 for generating power, the clutch motor 30 with an outer rotor 32 and an inner rotor 34, the assist motor 40 with a rotor 42, and the controller 80 for driving and controlling the clutch motor 30 and the assist motor 40. The outer rotor 32 of the clutch motor 30 is mechanically connected to one end of the crankshaft 56 of the gasoline engine 50, whereas the inner rotor 34 thereof is mechanically linked with the rotor 42 of the assist motor 40.

As shown in FIG. 1, the clutch motor 30 is constructed as a synchronous motor having permanent magnets 35 attached to an inner surface of the outer rotor 32 and three-phase coils 36 wound on slots formed in the inner rotor 34. Power is supplied to the three-phase coils 36 via a rotary transformer 38. A thin laminated sheet of non-directional electromagnetic steel is used to form teeth and slots for the three-phase coils 36 in the inner rotor 34. A resolver 39 for measuring a rotational angle θe of the crankshaft 56 is attached to the crankshaft 56. The resolver 39 may also serve as the angle sensor 78 mounted on the distributor 60.

The assist motor 40 is also constructed as a synchronous motor having three-phase coils 44, which are wound on a stator 43 fixed to a casing 45 to generate a rotating magnetic field. The stator 43 is also made of a thin laminated sheet of non-directional electromagnetic steel. A plurality of permanent magnets 46 are attached to an outer surface of the rotor 42. In the assist motor 40, interaction between a magnetic field formed by the permanent magnets 46 and a rotating magnetic field formed by the three-phase coils 44 leads to rotation of the rotor 42. The rotor 42 is mechanically linked with the drive shaft 22 working as the torque output shaft of the power output apparatus 20. A resolver 48 for measuring a rotational angle θd of the drive shaft 22 is attached to the drive shaft 22, which is further supported by a bearing 49 held in the casing 45.

The inner rotor 34 of the clutch motor 30 is mechanically linked with the rotor 42 of the assist motor 40 and further with the drive shaft 22. When the rotation and axial torque of the crankshaft 56 of the gasoline engine 50 are transmitted via the outer rotor 32 to the inner rotor 34 of the clutch motor 30, the rotation and torque by the assist motor 40 are added to or subtracted from the transmitted rotation and torque.

While the assist motor 40 is constructed as a conventional permanent magnet-type three-phase synchronous motor, the clutch motor 30 includes two rotating elements or rotors, that is, the outer rotor 32 with the permanent magnets 35 and the inner rotor 34 with the three-phase coils 36. The detailed structure of the clutch motor 30 is described with the cross sectional view of FIG. 2. The outer rotor 32 of the clutch motor 30 is attached to a circumferential end of a wheel 57 set around the crankshaft 56, by means of a pressure pin 59a and a screw 59b. A central portion of the wheel 57 is protruded to form a shaft-like element, to which the inner rotor 34 is rotatably attached by means of bearings 37A and 37B. One end of the drive shaft 22 is fixed to the inner rotor 34.

A plurality of permanent magnets 35, four in this embodiment, are attached to the inner surface of the outer rotor 32 as mentioned previously. The permanent magnets 35 are magnetized in the direction towards the axial center of the clutch motor 30, and have magnetic poles of alternately inverted directions. The three-phase coils 36 of the inner rotor 34 facing to the permanent magnets 35 across a little gap are wound on a total of 24 slots (not shown) formed in the inner rotor 34. Supply of electricity to the respective coils forms magnetic fluxes running through the teeth (not shown), which separate the slots from one another. Supply of a three-phase alternating current to the respective coils rotates this magnetic field. The three-phase coils 36 are connected to receive electric power supplied from the rotary transformer 38. The rotary transformer 38 includes primary windings 38a fixed to the casing 45 and secondary windings 38b attached to the drive shaft 22 coupled with the inner rotor 34. Electromagnetic induction allows electric power to be transmitted from the primary windings 38a to the secondary windings 38b or vice versa. The rotary transformer 38 has windings for three phases, that is, U, V, and W phases, to enable the transmission of three-phase electric currents.

Interaction between a magnetic field formed by one adjacent pair of permanent magnets 35 and a rotating magnetic field formed by the three-phase coils 36 of the inner rotor 34 leads to a variety of behaviors of the outer rotor 32 and the inner rotor 34. The frequency of the three-phase alternating current supplied to the three-phase coils 36 is generally equal to a difference between the revolving speed (revolutions per second) of the outer rotor 32 directly connected to the crankshaft 56 and the revolving speed of the inner rotor 34. This results in a slip between the rotations of the outer rotor 32 and the inner rotor 34. Details of the control procedures of the clutch motor 30 and the assist motor 40 will be described later based on the flowcharts.

As mentioned above, the clutch motor 30 and the assist motor 40 are driven and controlled by the controller 80. Referring back to FIG. 1, the controller 80 includes a first driving circuit 91 for driving the clutch motor 30, a second driving circuit 92 for driving the assist motor 40, a control CPU 90 for controlling both the first and second driving circuits 91 and 92, and a battery 94 including a number of secondary cells. The control CPU 90 is a one-chip microprocessor including a RAM 90a used as a working memory, a ROM 90b in which various control programs are stored, an input/output port (not shown), and a serial communication port (not shown) through which data are sent to and received from the EFIECU 70. The control CPU 90 receives a variety of data through the input/output port. The input data include a rotational angle θe of the crankshaft 56 of the gasoline engine 50 from the resolver 39, a rotational angle θd of the drive shaft 22 from the resolver 48, an accelerator pedal position AP (step-on amount of the accelerator pedal 64) from the accelerator position sensor 65, a gearshift position SP from the gearshift position sensor 84, clutch motor currents Iuc and Ivc from two ammeters 95 and 96 in the first driving circuit 91, assist motor currents Iua and Iva from two ammeters 97 and 98 in the second driving circuit 92, and a residual capacity BRM of the battery 94 from a residual capacity meter 99. The residual capacity meter 99 may determine the residual capacity BRM of the battery 94 by any known method; for example, by measuring the specific gravity of an electrolytic solution in the battery 94 or the whole weight of the battery 94, by computing the currents and time of charge and discharge, or by causing an instantaneous short-circuit between terminals of the battery 94 and measuring an internal resistance against the electric current.

The control CPU 90 outputs a first control signal SW1 for driving six transistors Tr1 through Tr6 working as switching elements of the first driving circuit 91 and a second control signal SW2 for driving six transistors Tr11 through Tr16 working as switching elements of the second driving circuit 92. The six transistors Tr1 through Tr6 in the first driving circuit 91 constitute a transistor inverter and are arranged in pairs to work as a source and a drain with respect to a pair of power lines P1 and P2. The three-phase coils (U,v,w) 36 of the clutch motor 30 are connected via the rotary transformer 38 to the respective contacts of the paired transistors. The power lines P1 and P2 are respectively connected to plus and minus terminals of the battery 94. The first control signal SW1 output from the control CPU 90 successively controls the power-on time of the paired transistors Tr1 through Tr6. The electric current flowing through each coil 36 undergoes PWM (pulse width modulation) to give a quasi-sine wave, which enables the three-phase coils 36 to form a rotating magnetic field.

The six transistors Tr11 through Tr16 in the second driving circuit 92 also constitute a transistor inverter and are arranged in the same manner as the transistors Tr1 through Tr6 in the first driving circuit 91. The three-phase coils (U,V,W) 44 of the assist motor 40 are connected to the respective contacts of the paired transistors. The second control signal SW2 output from the control CPU 90 successively controls the power-on time of the paired transistors Tr11 through Tr16. The electric current flowing through each coil 44 undergoes PWM to give a quasi-sine wave, which enables the three-phase coils 44 to form a rotating magnetic field.

The power output apparatus 20 thus constructed works in accordance with the operation principles described below, especially with the principle of torque conversion. By way of example, it is assumed that the gasoline engine 50 driven by the EFIECU 70 rotates at a predetermined revolving speed Ne. While the transistors Tr1 through Tr6 in the first driving circuit 91 are in OFF position, the controller 80 does not supply any current to the three-phase coils 36 of the clutch motor 30 via the rotary transformer 38. No supply of electric current causes the outer rotor 32 of the clutch motor 30 to be electromagnetically disconnected from the inner rotor 34. This results in racing the crankshaft 56 of the gasoline engine 50. Under the condition that all the transistors Tr1 through Tr6 are in OFF position, there is no regeneration of energy from the three-phase coils 36, and the gasoline engine 50 is kept at an idle.

As the control CPU 90 of the controller 80 outputs the first control signal SW1 to control on and off the transistors Tr1 through Tr6 in the first driving circuit 91, a constant electric current is flown through the three-phase coils 36 of the clutch motor 30, based on the difference between a revolving speed Ne of the crankshaft 56 of the gasoline engine 50 and a revolving speed Nd of the drive shaft 22 (that is, difference Nc (=Ne−Nd) between the revolving speed of the outer rotor 32 and that of the inner rotor 34 in the clutch motor 30). A certain slip accordingly exists between the outer rotor 32 and the inner rotor 34 of the clutch motor 30. At this moment, the inner rotor 34 rotates at a revolving speed lower than that of the outer rotor 32. This implies that the revolving speed Nd of the drive shaft 22 is lower than the revolving speed Ne of the crankshaft 56 of the gasoline engine 50 (Nd<Ne). In this state, the clutch motor 30 functions as a generator and carries out the regenerative operation to regenerate an electric current via the first driving circuit 91. In order to allow the assist motor 40 to consume energy identical with the electrical energy regenerated by the clutch motor 30, the control CPU 90 controls on and off the transistors Tr11 through Tr16 in the second driving circuit 92. The on-off control of the transistors Tr11 through Tr16 enables an electric current to flow through the three-phase coils 44 of the assist motor 40, and the assist motor 40 consequently carries out is the power operation to produce a torque.

Figure 4:
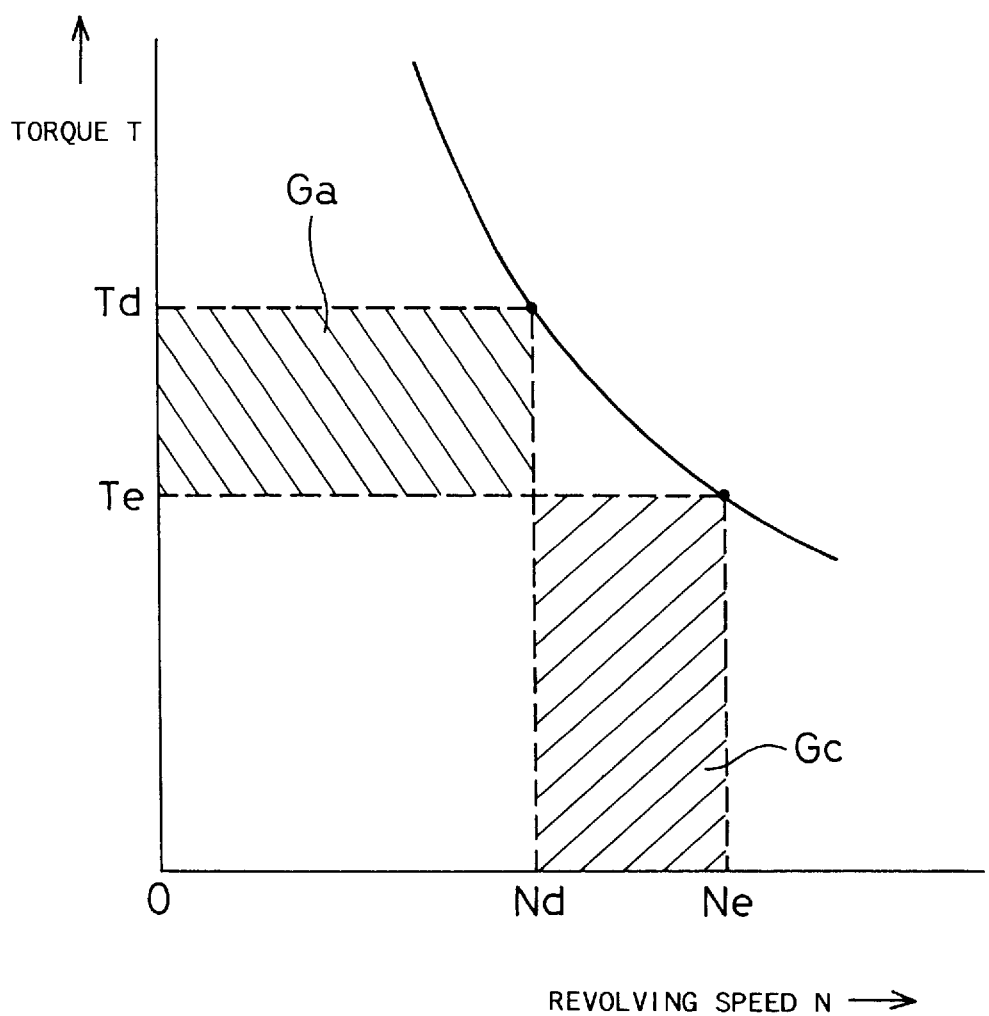
FIG. 4 is a graph schematically showing an amount of energy regenerated by the clutch motor 30 and that consumed by the assist motor 40.

FIG. 4 is a graph schematically illustrating an amount of energy regenerated by the clutch motor 30 and that consumed by the assist motor 40. While the crankshaft 56 of the gasoline engine 50 is driven at a revolving speed Ne and a torque Te, energy in a region Gc is regenerated as electric power by the clutch motor 30. The regenerated power is supplied to the assist motor 40 and converted to energy in a region Ga, which enables the drive shaft 22 to rotate at a revolving speed Nd and a torque Td. The torque conversion is carried out in the manner discussed above, and the energy corresponding to the slip in the clutch motor 30 or the revolving speed difference (Ne−Nd) is consequently given as a torque to the drive shaft 22.

When the revolving speed Nd of the drive shaft 22 has increased to be higher than the revolving speed Ne of the crankshaft 56 of the gasoline engine 50 (Nd>Ne), the vehicle falls in the overdrive state. At this moment, the inner rotor 34 starts rotating at a revolving speed higher than that of the outer rotor 32 in the clutch motor 30. When the control CPU 90 of the controller 80 outputs the first control signal SW1 to control on and off the transistors Tr1 through Tr6 in the first driving circuit 91 under the overdrive condition, the clutch motor 30 functions as a normal motor. Namely the clutch motor 30 carries out the power operation to enhance the speed of rotation of the inner rotor 34 relative to the outer rotor 32. This results in further increasing the revolving speed Nd of the drive shaft 22. While functioning as a normal motor, the clutch motor 30 consumes the electrical energy.

In order to allow the assist motor 40 to regenerate energy identical with the electrical energy consumed by the clutch motor 30, the control CPU 90 controls on and off the transistors Tr11 through Tr16 in the second driving circuit 92. The on-off control of the transistors Tr11 through Tr16 enables the assist motor 40 to carry out the regenerative operation. An electric current thus flows through the three-phase coils 44 of the assist motor 40, and electric power is consequently regenerated via the second driving circuit 92. The regenerated power is supplied to the clutch motor 30 to make up for the electrical energy consumed by the clutch motor 30.

Figure 5:
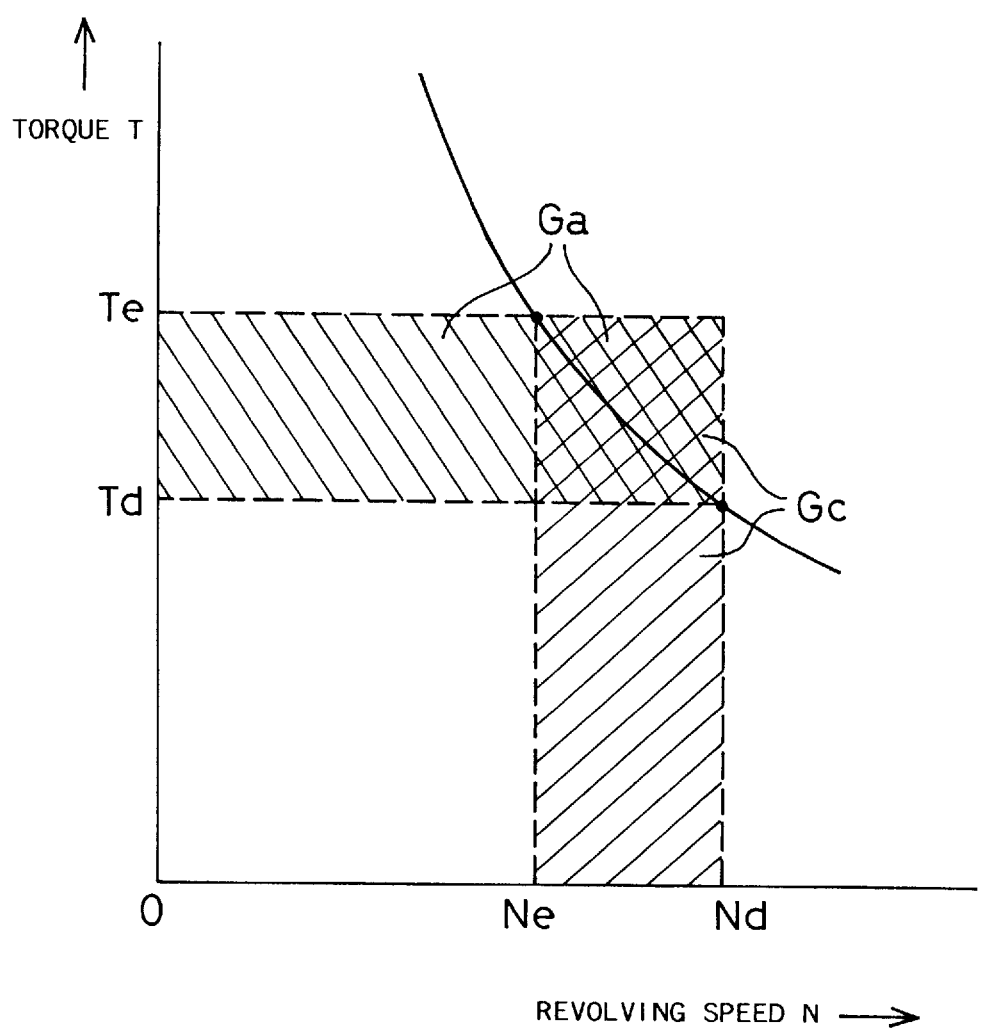
FIG. 5 is a graph schematically showing an amount of energy consumed by the clutch motor 30 and that regenerated by the assist motor 40.

FIG. 5 is a graph schematically illustrating an amount of energy consumed by the clutch motor 30 and that regenerated by the assist motor 40. By way of example, it is assumed that the crankshaft 56 of the gasoline engine 50 is driven at a revolving speed Ne and a torque Te and that the drive shaft 22 is rotated at a revolving speed Nd and a torque Td. In this state, energy in a region Ga is regenerated as electric power by the assist motor 40. The regenerated power is supplied to the clutch motor 30 and converted to energy in a region Gc, which is eventually consumed by the clutch motor 30. With a decrease in torque Td of the drive shaft 22 (that is, output torque) against the torque Te of the gasoline engine 50, the revolving speed Nd of the drive shaft 22 increases against the revolving speed Ne of the gasoline engine 50 (that is, the revolving speed of the crankshaft 56).

Other than the torque conversion and revolving speed conversion discussed above, the power output apparatus 20 of the embodiment can charge the battery 94 with an excess of electrical energy or discharge the battery 94 to supplement the electrical energy. This is implemented by controlling the mechanical energy output from the gasoline engine 50 (that is, the product of the torque Te and the revolving speed Ne), the electrical energy regenerated or consumed by the clutch motor 30, and the electrical energy regenerated or consumed by the assist motor 40. The output energy from the gasoline engine 50 can thus be transmitted as power to the drive shaft 22 at a higher efficiency.

Figure 6:
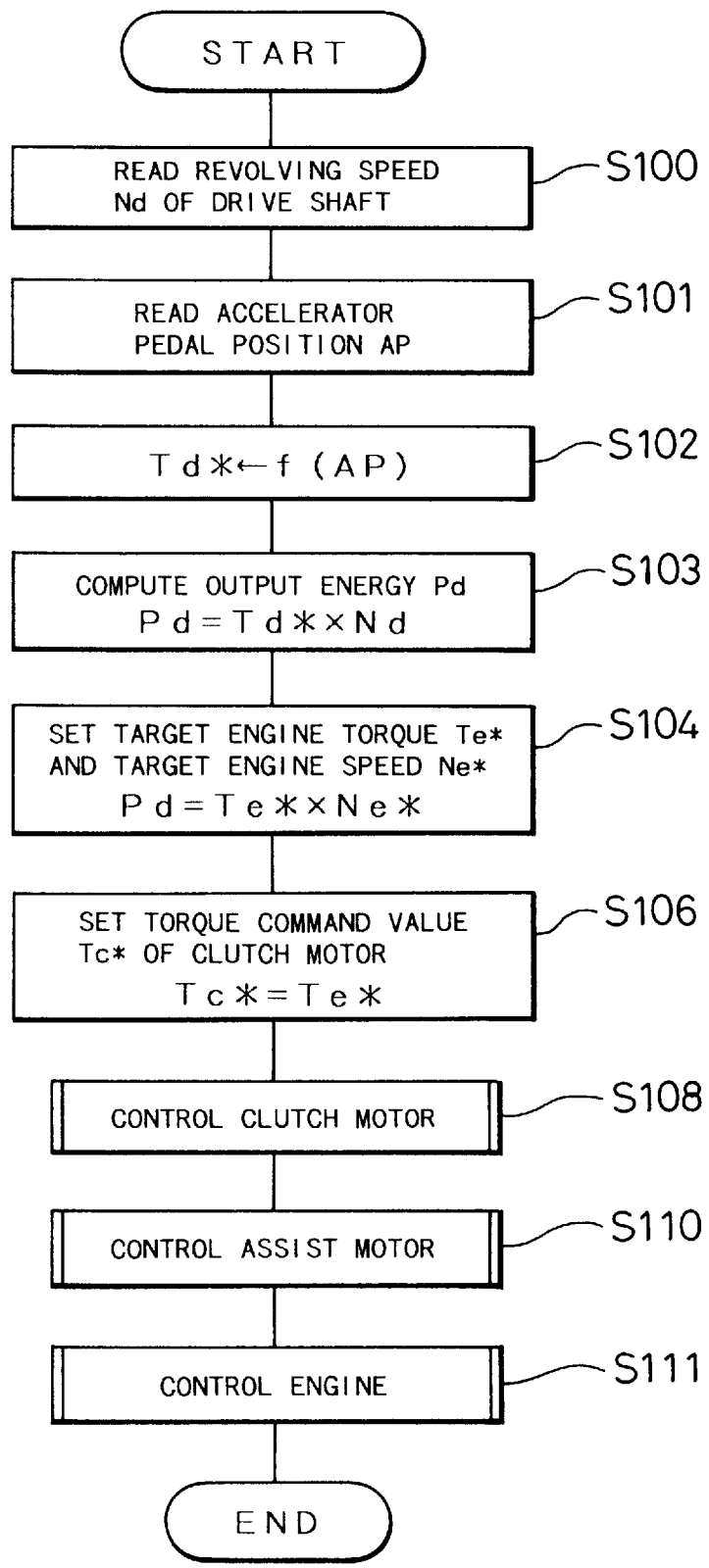
FIG. 6 is a flowchart showing a torque control routine executed by the control CPU 90 in the first embodiment.

The torque conversion discussed above is implemented by a torque control process as shown in the flowchart of FIG. 6. The torque control routine of FIG. 6 is executed by the control CPU 90 of the controller 80. When the program enters the routine, the control CPU 90 first receives data of revolving speed Nd of the drive shaft 22 at step S100. The revolving speed Nd of the drive shaft 22 can be computed from the rotational angle θd of the drive shaft 22 read from the resolver 48. At subsequent step S101, the control CPU 90 reads the accelerator pedal position AP output from the accelerator position sensor 65. The driver steps on the accelerator pedal 64 when feeling insufficiency of output torque. The value of the accelerator pedal position AP accordingly represents the desired output torque (that is, desired torque of the drive shaft 22) which the driver requires. The program then goes to step S102 at which the control CPU 90 computes a target output torque Td* (of the drive shaft 22) corresponding to the input accelerator pedal position AP. The target output torque Td* is also referred to as the output torque command value. Output torque command values Td* have been set previously for the respective accelerator pedal positions AP. In response to an input of the accelerator pedal position AP, the output torque command value Td* is extracted from the input accelerator pedal position AP.

At step S103, an amount of energy Pd to be output from the drive shaft 22 is calculated according to the expression Pd=Td*×Nd, that is, multiplying the extracted output torque command value Td* (of the drive shaft 22) by the input revolving speed Nd of the drive shaft 22. The program then proceeds to step S104 at which the control CPU 90 sets a target engine torque Te* and a target engine speed Ne* of the gasoline engine 50 based on the output energy Pd thus obtained. Here it is assumed that all the energy Pd to be output from the drive shaft 22 is supplied by the gasoline engine 50. Since the mechanical energy supplied from the gasoline engine 50 is equal to the product of the torque Te and the revolving speed Ne of the gasoline engine 50, the relationship between the output energy Pd, the target engine torque Te*, and the target engine speed Ne* can be expressed as Pd=Te*×Ne*. There are, however, numerous combinations of the target engine torque Te* and the target engine speed Ne* satisfying the above relationship. In this embodiment, an optimal combination of the target engine torque Te* and the target engine speed Ne* is selected in order to realize operation of the gasoline engine 50 at the possible highest efficiency.

At subsequent step S106, the control CPU 90 determines a torque command value Tc* of the clutch motor 30 based on the target engine torque Te* set at step S104. In order to keep the revolving speed Ne of the gasoline engine 50 at a substantially constant level, it is required to make the torque of the clutch motor 30 balance the torque of the gasoline engine 50. The processing at step S106 accordingly sets the torque command value Tc* of the clutch motor 30 equal to the target engine torque Te*.

After setting the torque command value Tc* of the clutch motor 30 at step S106, the program proceeds to steps S108, S110, and S111 to control the clutch motor 30, the assist motor 40, and the gasoline engine 50, respectively. As a matter of convenience of illustration, the control operations of the clutch motor 30, the assist motor 40, and the gasoline engine 50 are shown as separate steps. In the actual procedure, however, these control operations are carried out comprehensively. For example, the control CPU 90 simultaneously controls the clutch motor 30 and the assist motor 40 by interrupt processing, while transmitting an instruction to the EFIECU 70 through communication to control the gasoline engine 50 concurrently.

Figure 7:
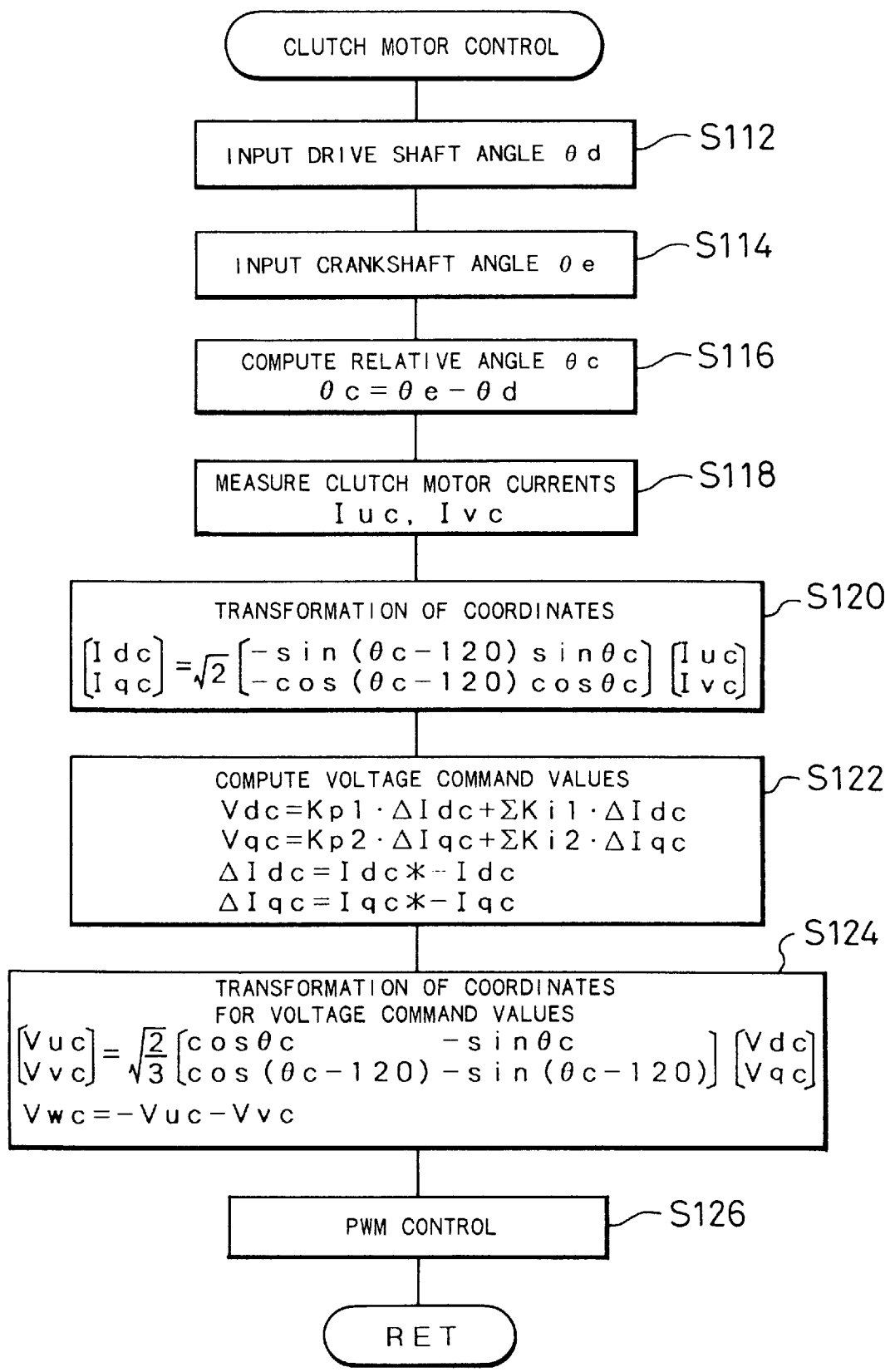
FIG. 7 is a flowchart showing essential steps of controlling the clutch motor 30 executed in the first embodiment.

The control of the clutch motor 30 (step S108 in FIG. 6) is implemented according to a clutch motor control routine shown in the flowchart of FIG. 7. When the program enters the clutch motor control routine, the control CPU 90 of the controller 80 first reads the rotational angle θd of the drive shaft 22 from the resolver 48 at step S112 and the rotational angle θe of the crankshaft 56 of the gasoline engine 50 from the resolver 39 at step S114. The control CPU 90 then computes a relative angle θc of the drive shaft 22 and the crankshaft 56 by the equation θc=θe−θd at step S116.

The program proceeds to step S118, at which the control CPU 90 receives data of clutch motor currents Iuc and Ivc, which respectively flow through the U phase and V phase of the three-phase coils 36 in the clutch motor 30, from the ammeters 95 and 96. Although the currents naturally flow through all the three phases U, V, and W, measurement is required only for the currents passing through the two phases since the sum of the currents is equal to zero. At subsequent step S120, the control CPU 90 executes transformation of coordinates (three-phase to two-phase transformation) using the values of currents flowing through the three phases obtained at step S118. The transformation of coordinates maps the values of currents flowing through the three phases to the values of currents passing through d and q axes of the permanent magnet-type synchronous motor and is executed according to Equation (1) given below:

$$\begin{bmatrix} Idc \\ Iqc \end{bmatrix} = \sqrt{2} \begin{bmatrix} -\sin(\theta c - 120) & \sin\theta c \\ -\cos(\theta c - 120) & \cos\theta c \end{bmatrix} \begin{bmatrix} Iuc \\ Ivc \end{bmatrix} \quad (1)$$

The transformation of coordinates is carried out because the currents flowing through the d and q axes are essential for the torque control in the permanent magnet-type synchronous motor. Alternatively, the torque control may be executed directly with the currents flowing through the three phases. After the transformation to the currents of two axes, the control CPU 90 computes deviations of currents Idc and Iqc actually flowing through the d and q axes from current command values Idc* and Iqc* of the respective axes, which are calculated from the torque command value Tc* of the clutch motor 30, and determines voltage command values Vdc and Vqc for the d and q axes at step S122. In accordance with a concrete procedure, the control CPU 90 executes operations following Equations (2) and Equations (3) given below:

$$\Delta Idc = Idc^* - Idc$$
$$\Delta Iqc = Iqc^* - Iqc \quad (2)$$

$$Vdc = Kp1 \cdot \Delta Idc + \Sigma Ki1 \cdot \Delta Idc$$
$$Vqc = Kp2 \cdot \Delta Iqc + \Sigma Ki2 \cdot \Delta Iqc \quad (3)$$

wherein Kp1, Kp2, Ki1, and Ki2 represent coefficients, which are adjusted to be suited to the characteristics of the motor applied.

The voltage command value Vdc (Vqc) includes a part in proportion to the deviation ΔI from the current command value I* (first term in right side of Equation (3)) and a summation of historical data of the deviations ΔI for 'i' times (second term in right side). The control CPU 90 then re-transforms the coordinates of the voltage command values thus obtained (two-phase to three-phase transformation) at step S124. This corresponds to an inverse of the transformation executed at step S120. The inverse transformation determines voltages Vuc, Vvc, and Vwc actually applied to the three-phase coils 36 as given below:

$$\begin{bmatrix} Vuc \\ Vvc \\ Vwc = -Vuc - Vvc \end{bmatrix} = \sqrt{\frac{2}{3}} \begin{bmatrix} \cos\theta c & -\sin\theta c \\ \cos(\theta c - 120) & -\sin(\theta c - 120) \end{bmatrix} \begin{bmatrix} Vdc \\ Vdq \end{bmatrix} \quad (4)$$

The actual voltage control is accomplished by on-off operation of the transistors Tr1 through Tr6 in the first driving circuit 91. At step S126, the on- and off-time of the transistors Tr1 through Tr6 in the first driving circuit 91 is PWM (pulse width modulation) controlled in order to attain the voltage command values Vuc, Vvc, and Vwc determined by Equation (4) above. This process enables the clutch motor 30 to mechanically transmit the target torque to the drive shaft 22.

Figure 8:
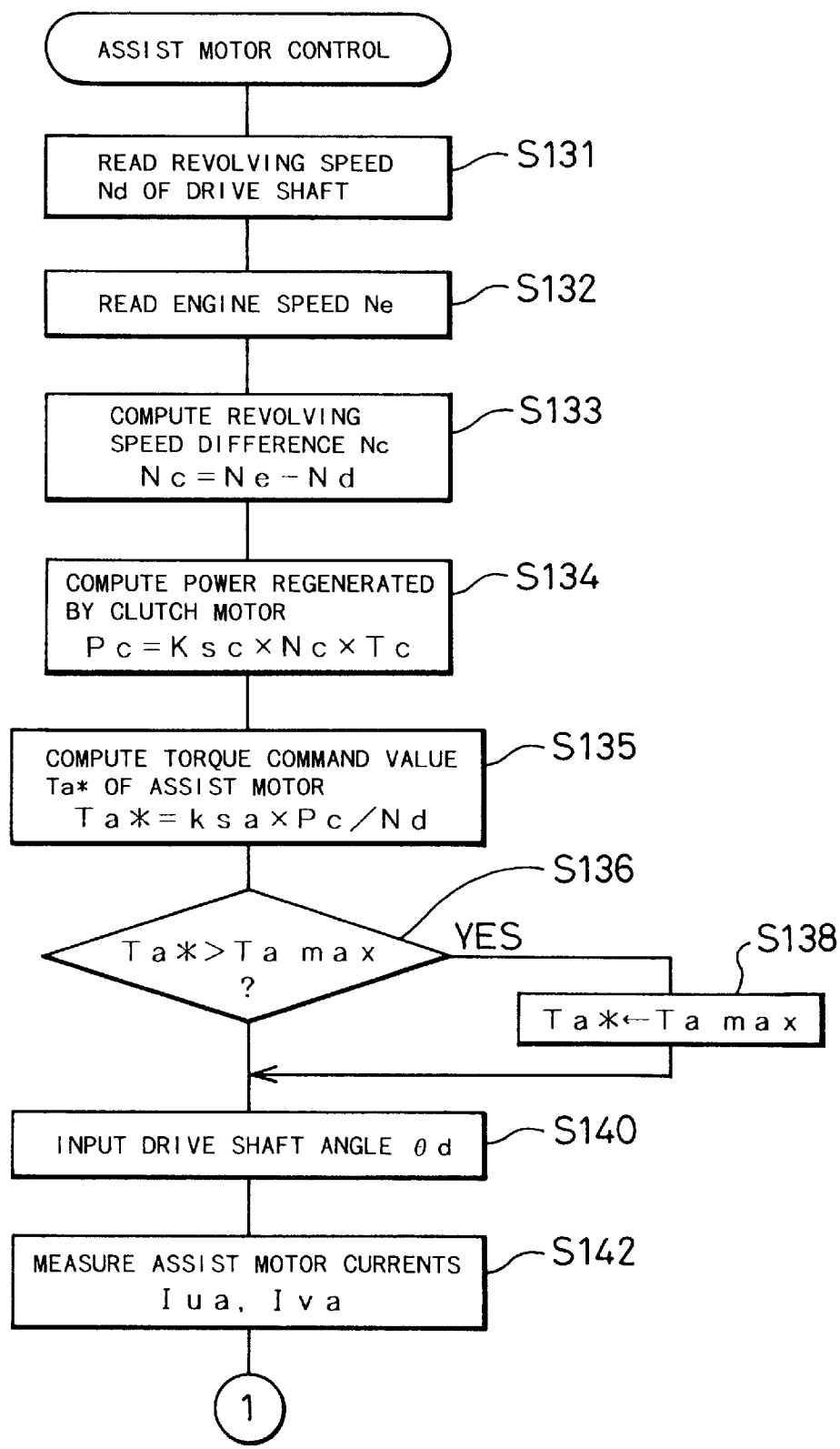
FIGS. 8 and 9 are flowcharts showing essential steps of controlling the assist motor 40 executed in the first embodiment.
Figure 9:
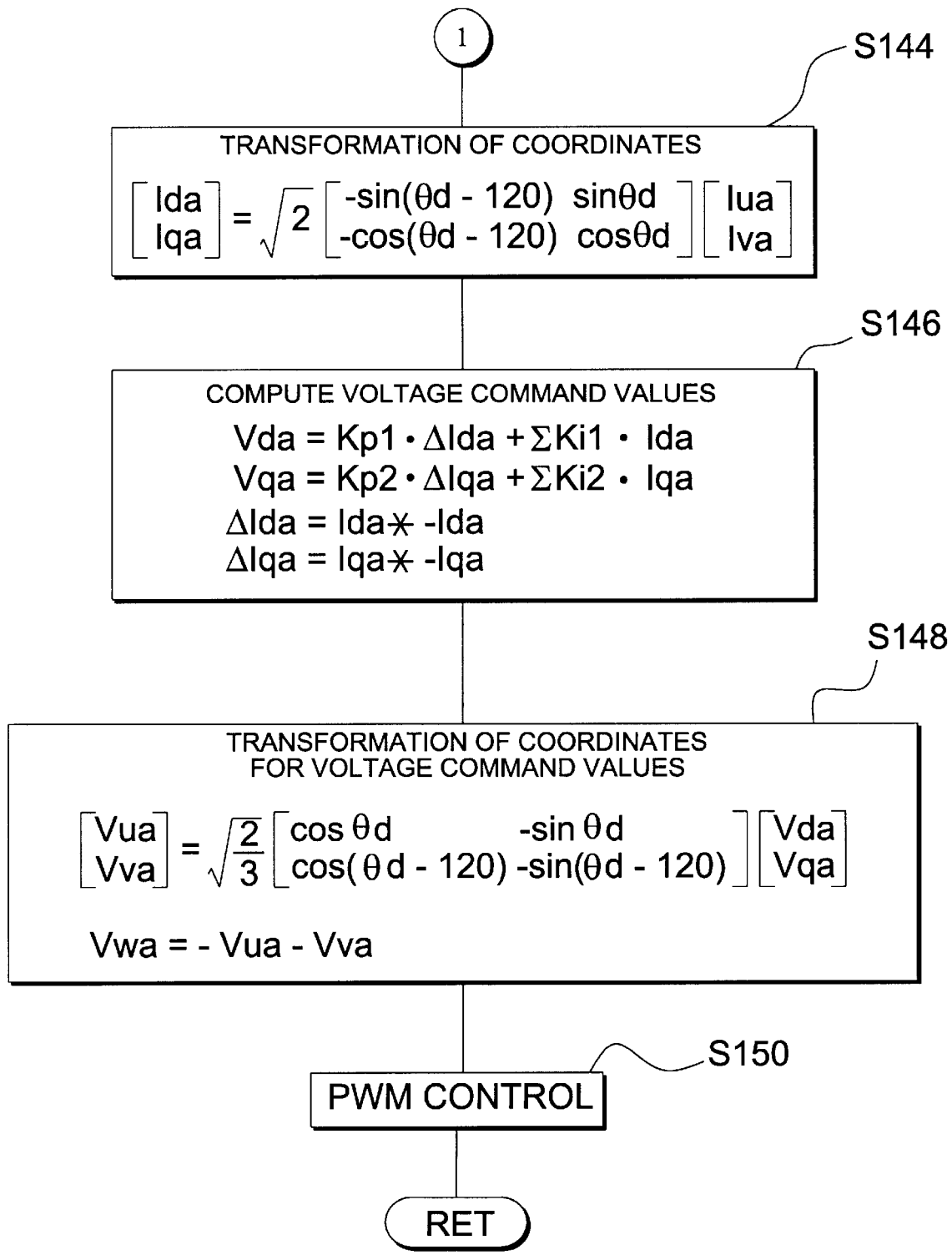

The control of the assist motor 40 (step S110 in FIG. 6) is implemented according to an assist motor control routine shown in the flowcharts of FIGS. 8 and 9. Referring to the flowchart of FIG. 8, when the program enters the assist motor control routine, the control CPU 90 first receives data of revolving speed Nd of the drive shaft 22 at step S131. The revolving speed Nd of the drive shaft 22 is computed from the rotational angle θd of the drive shaft 22 read from the resolver 48. The control CPU 90 then receives data of revolving speed Ne of the gasoline engine 50 at step S132. The revolving speed Ne of the gasoline engine 50 may be computed from the rotational angle θe of the crankshaft 56 read from the resolver 39 or directly measured by the speed sensor 76 mounted on the distributor 60. In the latter case, the control CPU 90 receives data of revolving speed Ne of the gasoline engine 50 through communication with the EFIECU 70, which connects with the speed sensor 76.

A revolving speed difference Nc between the input revolving speed Nd of the drive shaft 22 and the input revolving speed Ne of the gasoline engine 50 is calculated according to the equation Nc=Ne−Nd at step S133. At subsequent step S134, electric power (energy) Pc regenerated by the clutch motor 30 is calculated according to the expression given as:

$$Pc = Ksc \times Nc \times Tc$$

wherein Ksc represents an efficiency of regenerative operation in the clutch motor 30. The product Nc×Tc defines energy in the region Gc of FIG. 4, wherein Nc and Tc respectively denote the revolving speed difference and the actual torque produced by the clutch motor 30.

At step S135, a torque command value Ta* of the assist motor 40 is determined by the expression given as:

$$Ta^* = ksa \times Pc / Nd$$

wherein ksa represents an efficiency of power operation in the assist motor 40. The torque command value Ta* of the assist motor 40 thus obtained is compared with a maximum torque Tamax, which the assist motor 40 can potentially apply, at step S136. When the torque command value Ta* exceeds the maximum torque Tamax, the program proceeds to step S138 at which the torque command value Ta* is restricted to the maximum torque Tamax.

After the torque command value Ta* is set equal to the maximum torque Tamax at step S138 or after the torque command value Ta* is determined not to exceed the maximum torque Tamax at step S136, the control CPU 90 reads the rotational angle θd of the drive shaft 22 from the resolver 48 at step S140, and receives data of assist motor currents Iua and Iva, which respectively flow through the U phase and V phase of the three-phase coils 44 in the assist motor 40, from the ammeters 97 and 98 at step S142. Referring to the flowchart of FIG. 9, the control CPU 90 then executes transformation of coordinates for the currents of the three phases at step S144, computes voltage command values Vda and Vqa at step S146, and executes inverse transformation of coordinates for the voltage command values at step S148. At subsequent step S150, the control CPU 90 determines the on- and off-time of the transistors Tr11 through Tr16 in the second driving circuit 92 for PWM (pulse width modulation) control. The processing executed at steps S144 through S150 is similar to that executed at steps S120 through S126 of the clutch motor control routine shown in the flowchart of FIG. 7.

The control of the gasoline engine 50 (step S111 in FIG. 6) is executed in the following manner. In order to attain stationary driving at the target engine torque Te* and the target engine speed Ne* (set at step S104 in FIG. 6), the control CPU 90 regulates the torque Te and the revolving speed Ne of the gasoline engine 50 to make them approach the target engine torque Te* and the target engine speed Ne*, respectively. In accordance with a concrete procedure, the control CPU 90 sends an instruction to the EFIECU 70 through communication to regulate the amount of fuel injection or the throttle valve position. Such regulation makes the torque Te and the revolving speed Ne of the gasoline engine 50 eventually approach the target engine torque Te* and the target engine speed Ne*.

According to the process described above, the clutch motor 30 converts the torque to electric power at the predetermined efficiency Ksc. In other words, the clutch motor 30 regenerates electric power in proportion to the difference between the revolving speed of the crankshaft 56 of the gasoline engine 50 and the revolving speed of the inner rotor 34 of the clutch motor 30. The assist motor 40 receives the electric power thus regenerated and applies a corresponding torque to the drive shaft 22. The torque applied to the drive shaft 22 by the assist motor 40 coincides with the torque converted to electric power by the clutch motor 30. In the graph of FIG. 4, the energy in the region Gc is converted to that in the region Ga to implement the torque conversion.

There is naturally a certain amount of energy loss in the clutch motor 30, the assist motor 40, the first driving circuit 91, and the second driving circuit 92. It is accordingly rare that the energy in the region Gc perfectly coincides with the energy in the region Ga under the actual condition. The energy loss in the clutch motor 30 and the assist motor 40 is relatively small since some synchronous motors recently developed have the efficiency very close to 1. The energy loss in the first driving circuit 91 and the second driving circuit 92 can also be sufficiently small since the ON-state resistance of known transistors, such as GTOs, applicable to Tr1 through Tr16 is extremely small. Most part of the revolving speed difference or the slip between the rotations of the drive shaft 22 and the crankshaft 56 is thus converted to energy for generation by the three-phase coils 36 and transmitted as a torque to the drive shaft 22 by the assist motor 40.

The power output apparatus 20 of the first embodiment can go into another application given as a second embodiment of the present invention. In the first embodiment, the assist motor 40 is controlled to produce an assist torque corresponding to the difference (Ne−Nd) between the revolving speed Ne of the crankshaft 56 of the gasoline engine 50 and the revolving speed Nd of the inner rotor 34 of the clutch motor 30 (or the drive shaft 22 fixed to the inner rotor 34). During the assist control, the gasoline engine 50 is driven at the possible highest efficiency, and the assist motor 40 produces an assist torque corresponding to the revolving speed difference to increase the torque Td of the drive shaft 22.

As described in the first embodiment, the assist motor 40 is driven by the electric power regenerated by the clutch motor 30 to increase the torque Td of the drive shaft 22. In some cases, however, the regenerated power of the clutch motor 30 may not be sufficient to increase the torque Td to a desired level. This occurs, for example, when the vehicle starts on a slope. In the second embodiment, the electric power stored in the battery 94 is utilized for the assist control. The assist control executed with the power of the battery 94 is hereinafter referred to as the power assist control.

Figure 10:
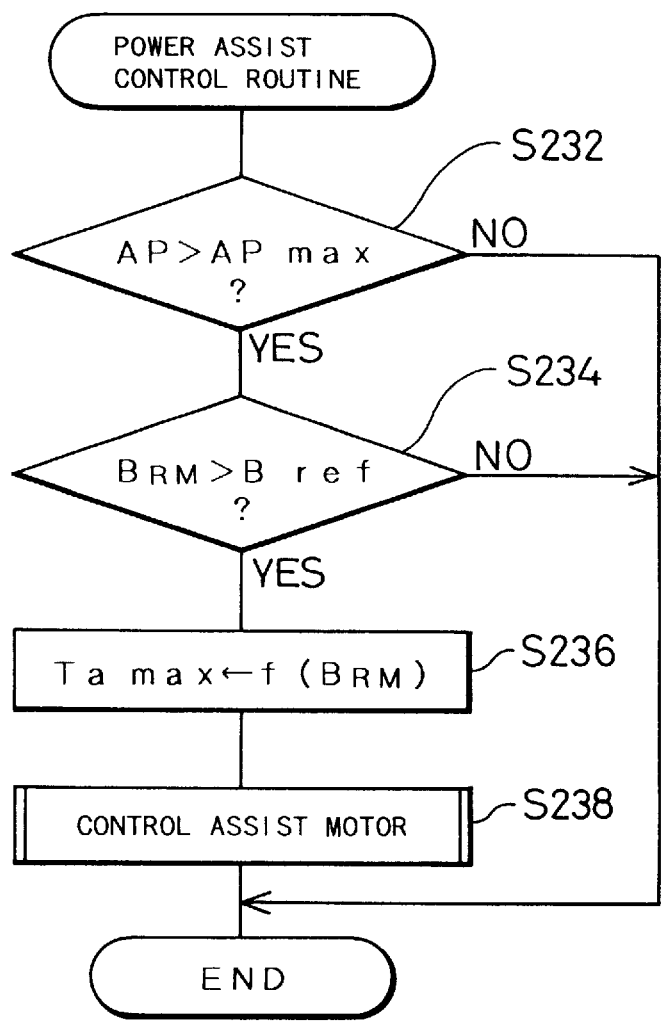
FIG. 10 is a flowchart showing a power assist control routine executed in a second embodiment of the present invention.

FIG. 10 is a flowchart showing a power assist control routine executed in the second embodiment of the invention.

When the program enters the routine, the accelerator pedal position AP read from the accelerator position sensor 65 is compared with a threshold value APmax at step S232. The residual capacity BRM of the battery 94 measured by the residual capacity meter 99 is then compared with a predetermined reference value Bref at step S234. The power assist control is carried out only when both the conditions are fulfilled, that is, when the accelerator pedal position AP is greater than the threshold value APmax and the residual capacity BRM is greater than the predetermined reference value Bref. A target torque Tamax corresponding to the residual capacity BRM of the battery 94 is set at step S236, and the assist motor 40 is controlled with the target torque Tamax at step S238. The control of the assist motor 40 at step S238 follows the steps of FIGS. 8 and 9 described previously.

The power assist control enables the drive shaft 22 to be driven with the torque greater than the output of the gasoline engine 50. The magnitude of the assist torque applied to the drive shaft 22 is varied depending upon the residual capacity BRM of the battery 94. This structure ensures a sufficient increase in torque of the drive shaft 22 under the condition of sufficient residual capacity of the battery 94 and effectively prevents the battery 94 from being excessively exhausted under the condition of less residual capacity.

The power output apparatus 20 of the first embodiment can go into still another application given as a third embodiment of the present invention. In the second embodiment discussed above, when the regenerated power of the clutch motor 30 can not sufficiently increase the torque of the drive shaft 22, the power assist control is carried out to make up for the insufficiency with the electric power stored in the battery 94. The power assist control, however, consumes the electric power stored in the battery 94 and thereby decreases the residual capacity BRM of the battery 94 to a critical level. It is accordingly necessary to charge the battery 94 when the residual capacity BRM of the battery 94 decreases to or below a predetermined allowable minimum or otherwise whenever the driver requires. In any case, the battery 94 is charged with the electric power regenerated by the motor. As discussed in the first embodiment, in the process of assist control, the clutch motor 30 works as a generator and regenerates an electric power via the first driving circuit 91. Part of the regenerated power (that is, the portion not used by the assist motor 40 to produce an assist torque) may be used to charge the battery 94. The electric power regenerated by the clutch motor 30 is, however, insufficient for the rapid charging. In the third embodiment, the battery 94 is charged with an electric power regenerated by the assist motor 40 as well as that regenerated by the clutch motor 30.

Figure 11:
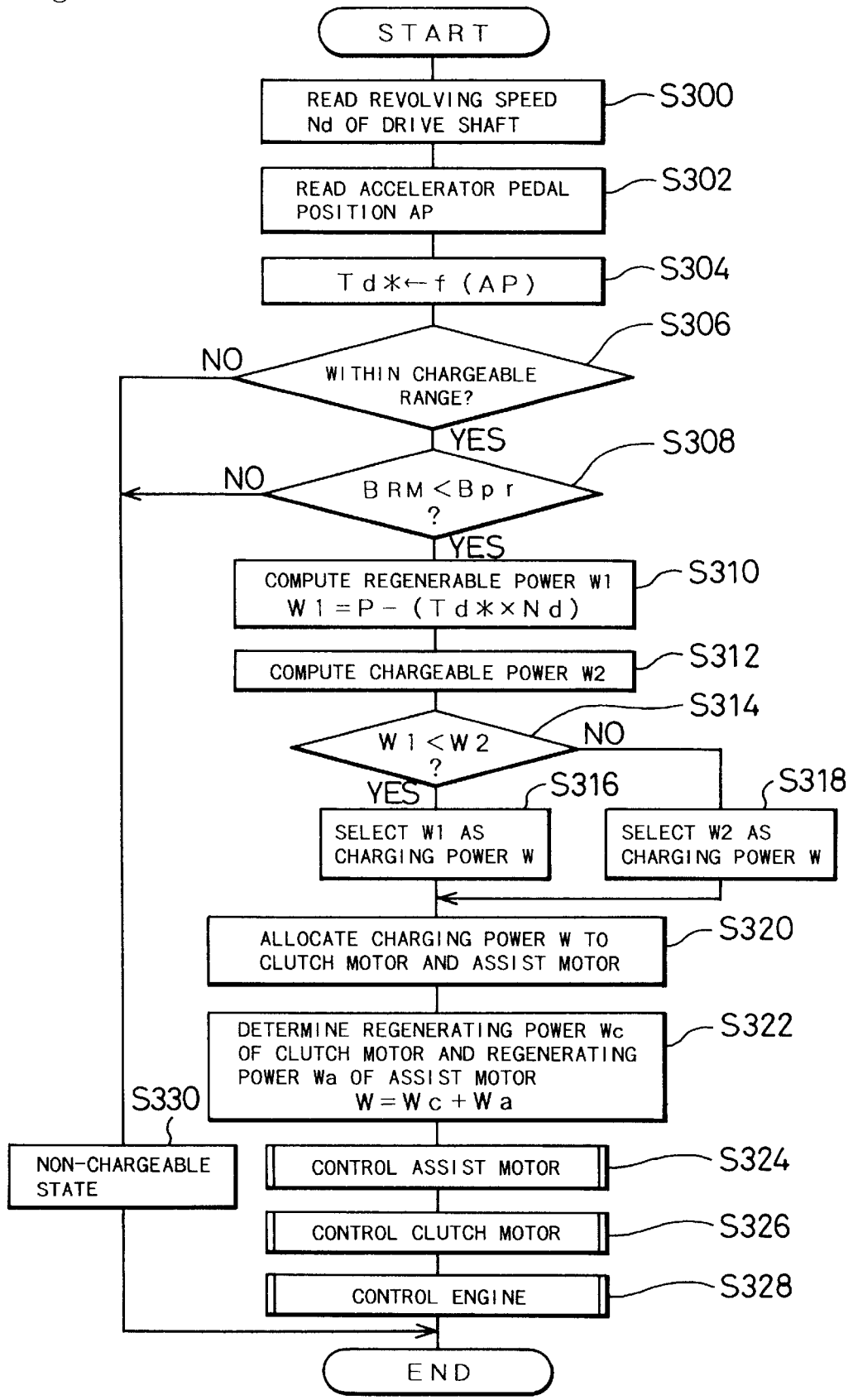
FIG. 11 is a flowchart showing a control routine executed in a third embodiment of the present invention.

FIG. 11 is a flowchart showing a control process executed in the third embodiment of the invention. When the program enters the routine, the control CPU 90 of the controller 80 first receives data of revolving speed Nd of the drive shaft 22 at step S300 and reads the accelerator pedal position AP from the accelerator position sensor 65 at step S302, in the same manner as the first embodiment. The control CPU 90 then computes the output torque (torque of the drive shaft 22) command value Td* corresponding to the input accelerator pedal position AP at step S304.

Figure 12:
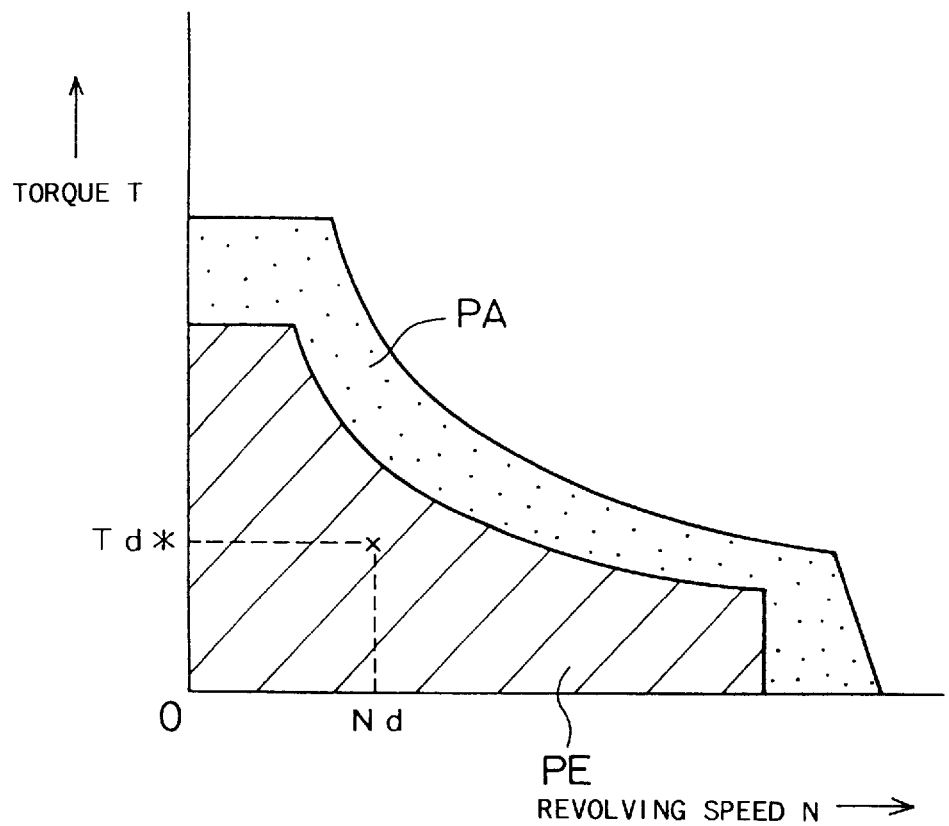
FIG. 12 shows a chargeable range map used in the third embodiment.

It is determined at step S306 whether the output torque command value Td* thus calculated and the input revolving speed Nd of the drive shaft 22 define a point in a chargeable range. In accordance with a concrete procedure, the point defined by the output torque command value Td* and the revolving speed Nd of the drive shaft 22 is located in a chargeable range map as shown in FIG. 12. In the graph of FIG. 12, the torque of the drive shaft 22 is plotted as ordinate and the revolving speed of the drive shaft 22 as abscissa. In a chargeable range PE, the energy supplied from the gasoline engine 50 can be regenerated as an electric power. The chargeable range PE also corresponds to an operable range of the gasoline engine 50. In a power assist range PA, on the other hand, the power assist control described above is carried out to make up for the insufficiency of torque with the electric power stored in the battery 94. The electric power stored in the battery 94 is consumed in the power assist range PA, which accordingly represents a non-chargeable range.

When the defined point is not in the chargeable range at step S306, the program determines a non-chargeable state at step S330 and exits from the control routine. When the defined point is in the chargeable range at step S306, on the contrary, the program proceeds to step S308 at which the residual capacity BRM of the battery 94 measured by the residual capacity meter 99 is compared with a predetermined proper level Bpr. When the residual capacity BRK of the battery 94 is less than the predetermined proper level Bpr, the battery 94 requires charging and the program proceeds to step S310. When the residual capacity BRM is equal to or greater than the predetermined proper level Bpr, on the other hand, the battery 94 does not require charging and the program determines the non-chargeable state at step S330 and exits from the routine.

At step S310, an electric power W1 regenerable by the clutch motor 30 and the assist motor 40 is computed according to the equation given as:

$$W1 = P - (Td^* \times Nd)$$

wherein P denotes a maximum energy suppliable by the gasoline engine 50 under a certain condition. The electric power W1 regenerable by the clutch motor 30 and the assist motor 40 corresponds to a residual energy calculated by subtracting the energy output from the drive shaft 22 (that is, $Td^* \times Nd$) from the maximum energy P suppliable by the gasoline engine 50.

Figure 13:
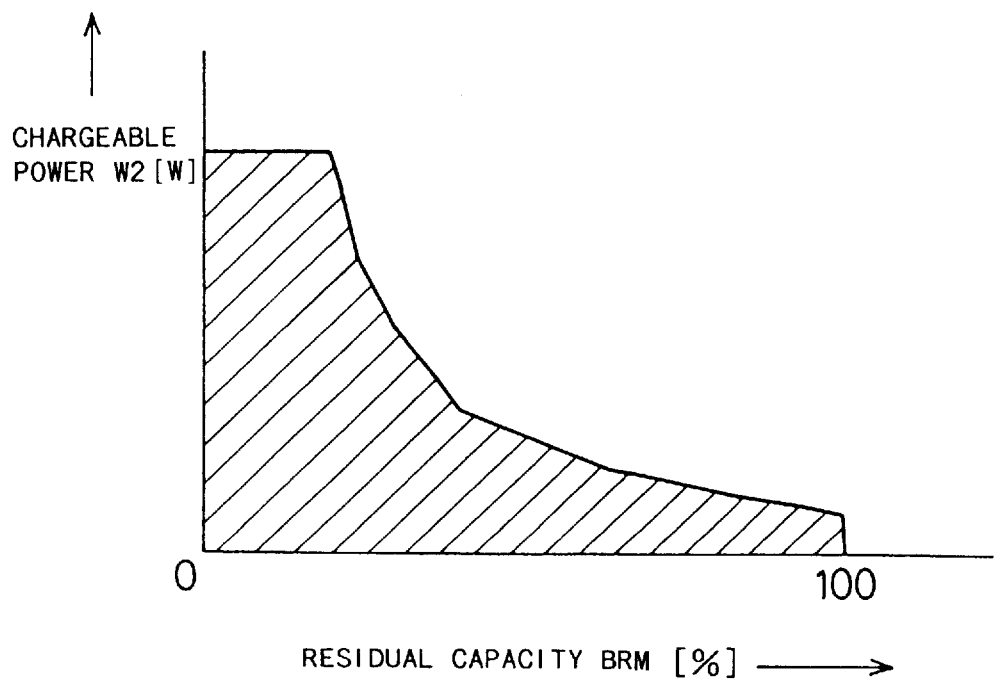
FIG. 13 is a graph showing the chargeable power plotted against the residual capacity of the battery 94 in the third embodiment.

At subsequent step S312, a chargeable power W2 in the battery 94 is computed from the residual capacity BRM of the battery 94 measured by the residual capacity meter 99. The graph of FIG. 13 shows the chargeable power W2 [w] in the battery 94 plotted against the residual capacity BRM [%] of the battery 94. The chargeable power W2 in the battery 94 decreases with an increase in residual capacity BRM of the battery 94.

In the subsequent process, the control CPU 90 compares the electric power W1 regenerable by the clutch motor 30 and the assist motor 40 with the chargeable power W2 in the battery 94 and selects the lower power as an actual charging power W, with which the battery 94 is actually charged. The regenerable power W1 is compared with the chargeable power W2 at step S314. When the regenerable power W1 is lower than the chargeable power W2, the regenerable power W1 is selected as the actual charging power W at step S316. When the chargeable power W2 is lower than the regenerable power W1, on the contrary, the chargeable power W2 is selected as the actual charging power W at step S318.

The control CPU 90 subsequently determines the allocation of the actual charging power W to the clutch motor 30 and the assist motor 40. In accordance with a concrete procedure, at step S320, the actual charging power W is divided into two parts, Wc and Wa. Wc denotes a power to be regenerated by the clutch motor 30 (hereinafter referred to as the regenerating power of the clutch motor 30), and Wa a power to be regenerated by the assist motor 40 (hereinafter referred to as the regenerating power of the assist motor 40). The control CPU 90 specifies the regenerating power Wc of the clutch motor 30 and the regenerating power Wa of the assist motor 40 based on the allocation to satisfy the equation W=Wc+Wa at step S322. The allocation of the power W to the clutch motor 30 and the assist motor 40 is determined by taking into account the generation capacity and efficiency of each motor or the deviation from an allowable maximum temperature of each motor (that is, the allowable maximum temperature current temperature).

After computing the regenerating powers of the clutch motor 30 and the assist motor 40 at step S322, the program proceeds to steps S324, S326, and S328 to control the assist motor 40, the clutch motor 30, and the gasoline engine 50, respectively. Like the flowchart of FIG. 6, as a matter of convenience of illustration, the control operations of the assist motor 40, the clutch motor 30, and the gasoline engine 50 are shown as separate steps in the flowchart of FIG. 11. In the actual procedure, however, these control operations are carried out comprehensively. For example, the control CPU 90 implements all the control operations simultaneously by utilizing the interrupt process.

Figure 14:
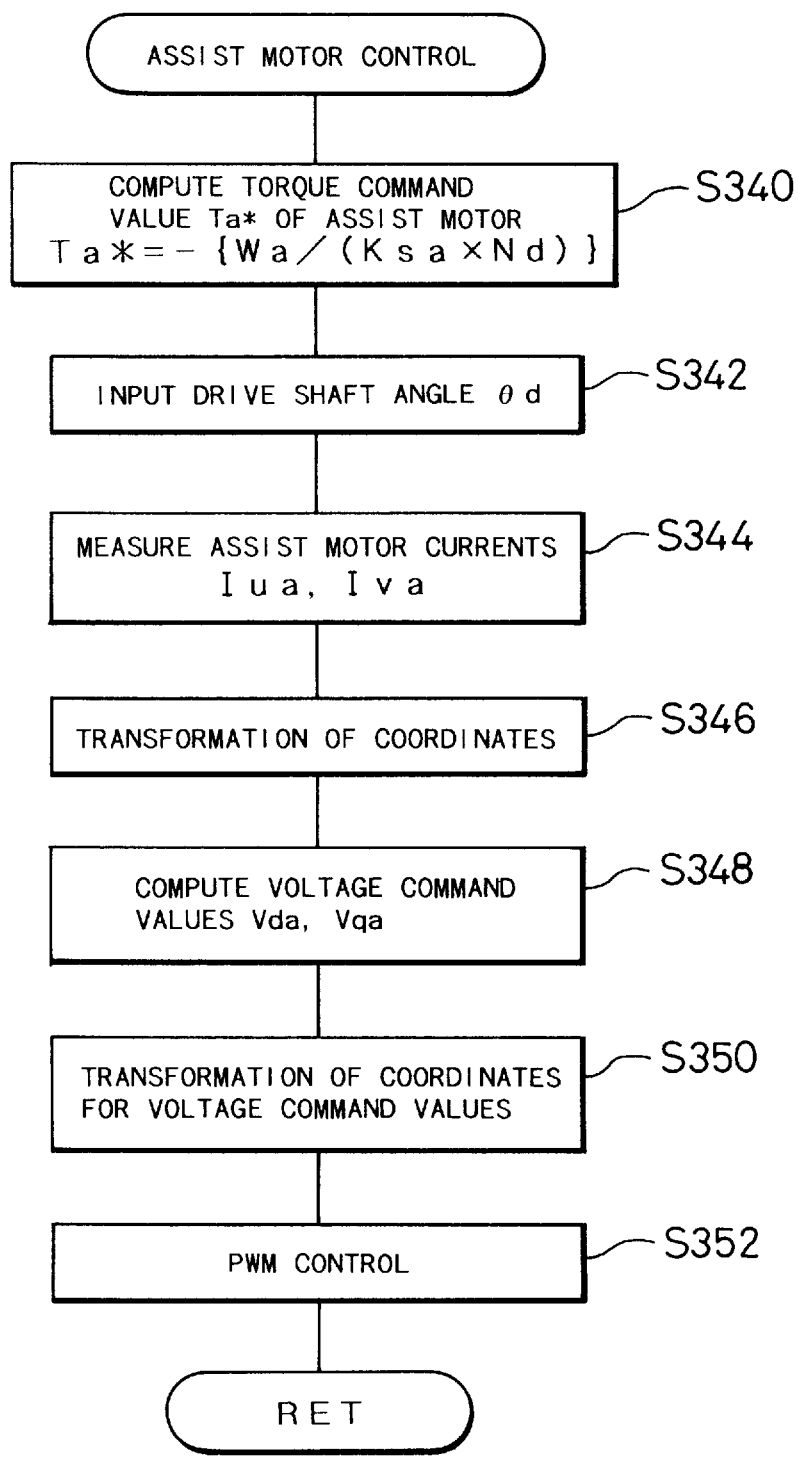
FIG. 14 is a flowchart showing an assist motor control routine executed in the third embodiment.

The control of the assist motor 40 (step S324 in FIG. 11) is implemented according to an assist motor control routine shown in the flowchart of FIG. 14. When the program enters the routine, the control CPU 90 of the controller 80 first determines the torque command value Ta* of the assist motor 40 at step S340 by the calculation expressed as:

$$Ta^* = -\{Wa/(Ksc \times Nd)\}$$

The torque command value or target torque Ta* to be produced by the assist motor 40 is determined by dividing the regenerating power Wa of the assist motor 40 by the product of the generation (regeneration) efficiency Ksa of the assist motor 40 and the revolving speed Nd of the drive shaft 22. Unlike the first and the second embodiments, the assist motor 40 is controlled to execute not the power operation but the regenerative operation in the third embodiment. The torque produced by the assist motor 40 in the third embodiment accordingly acts in the reverse of the torque produced by the assist motor 40 in the first or the second embodiment. Namely the torque of the assist motor 40 acts in the reverse of the rotation of the drive shaft 22. A minus sign is thus given to the right-side term of the above equation.

The assist motor 40 is controlled with the torque command value Ta* thus determined. The processing executed at subsequent steps S342 through S352 is identical with that executed at steps S140 through S150 in the flowcharts of FIGS. 8 and 9 of the first embodiment. As mentioned above, note that the torque produced by the assist motor 40 in the third embodiment acts in the reverse of the torque produced in the first embodiment and that the torque command value Ta* thereby has the minus sign.

Figure 15:
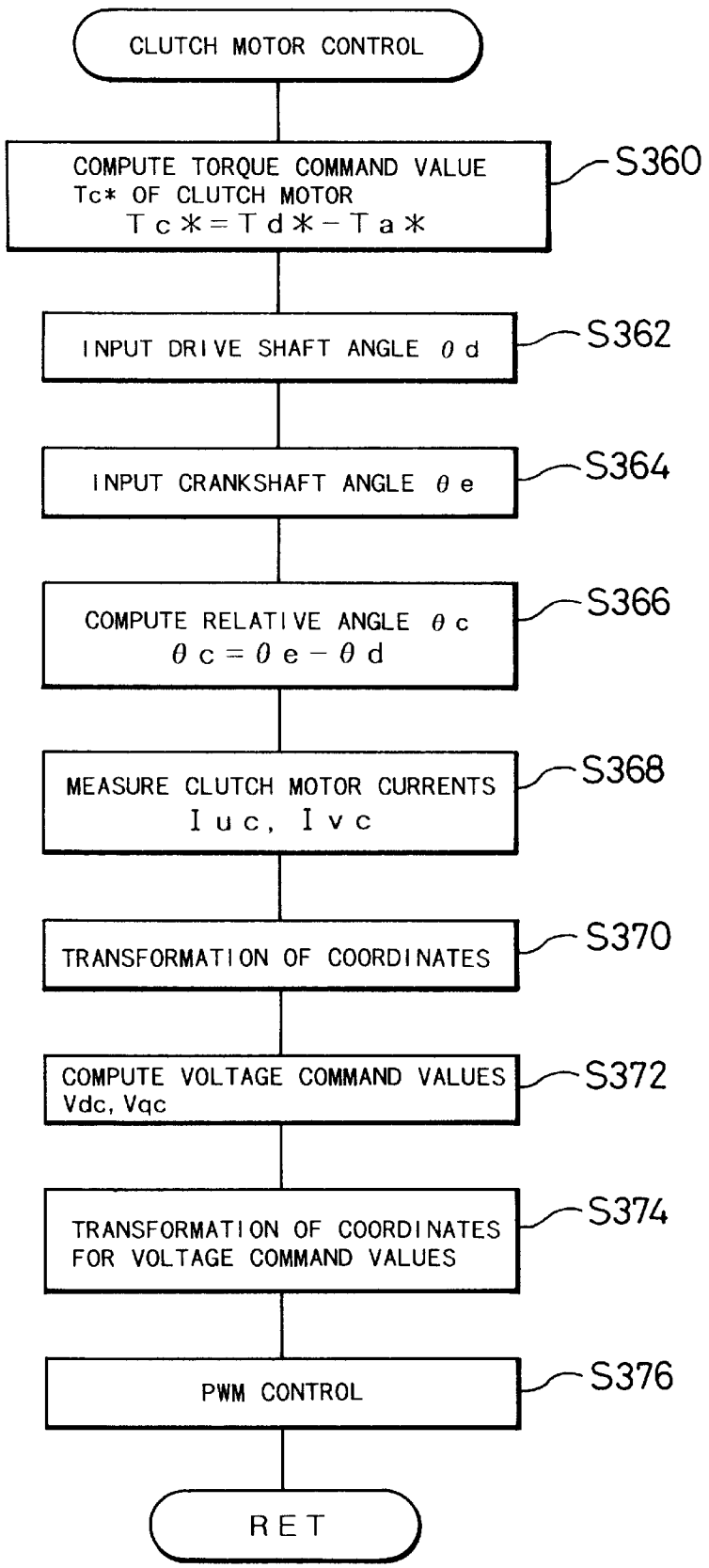
FIG. 15 is a flowchart showing a clutch motor control routine executed in the third embodiment.

The control of the clutch motor 30 (step S326 in FIG. 11) is implemented according to a clutch motor control routine shown in the flowchart of FIG. 15. When the program enters the routine, the control CPU 90 of the controller 80 first determines the torque command value Tc* of the clutch motor 30 at step S360 by the calculation expressed as:

$$Tc^* = Td^* - Ta^*$$

As described previously, the output torque (torque of the drive shaft 22) is given as the sum of the torques of the clutch motor 30 and the assist motor 40. The torque command value Tc* of the clutch motor 30 is thus given as the difference between the output torque command value Td* and the torque command value Ta* of the assist motor 40. Here also note that the torque produced by the assist motor 40 acts in the reverse of the rotation of the drive shaft 22 and that the torque command value Ta* of the assist motor 40 thereby has the minus sign.

The clutch motor 30 is controlled with the torque command value Tc* thus determined. The processing executed at subsequent steps S362 through S376 is identical with that executed at steps S112 through S126 in the flowchart of FIG. 7 of the first embodiment.

Figure 16:
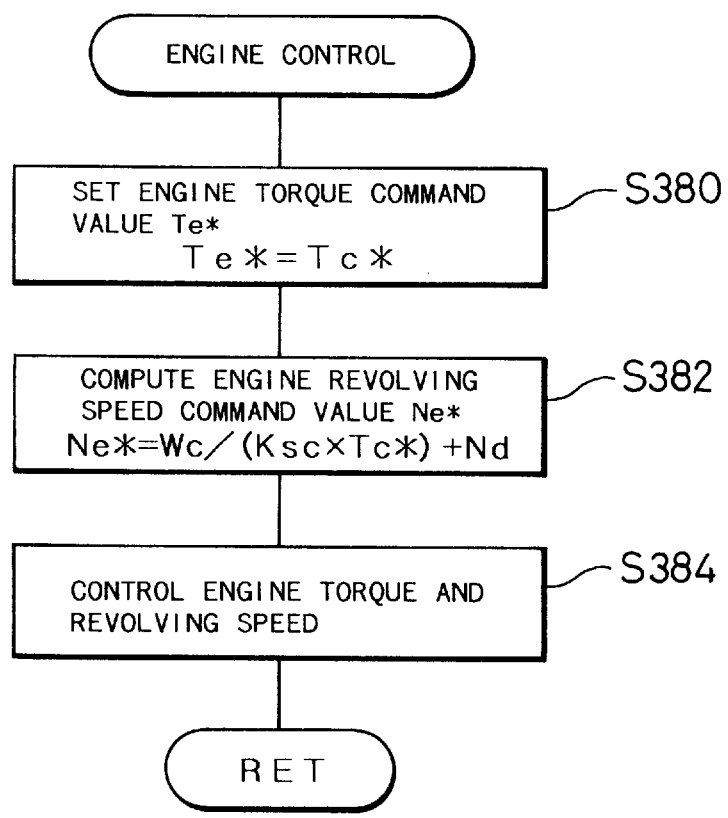
FIG. 16 is a flowchart showing a gasoline engine control routine executed in the third embodiment.

The control of the gasoline engine 50 (step S328 in FIG. 11) is implemented according to an engine control routine shown in the flowchart of FIG. 16. When the program enters the routine, the control CPU 90 of the controller 80 first sets the target engine torque or torque command value Te* of the gasoline engine 50 based on the torque command value Tc* of the clutch motor 30 at step S380. As previously described, in order to keep the revolving speed Ne of the gasoline engine 50 at a substantially constant level, it is required to make the torque of the clutch motor 30 balance the torque of the gasoline engine 50. The torque command value Te* of the gasoline engine 50 is thus set equal to the torque command value Tc* of the clutch motor 30.

At step S382, the target engine speed or revolving speed command value Ne* of the gasoline engine 50 is then determined by the calculation expressed as:

$$Ne^* = Wc/(Ksc \times Tc^*) + Nd \tag{5}$$

The revolving speed in the clutch motor 30 is given as the difference between the revolving speed Ne of the gasoline engine 50 (revolving speed of the crankshaft 56) and the revolving speed Nd of the drive shaft 22. The revolving speed in the clutch motor 30 is also determined by dividing the regenerating power Wc of the clutch 30 by the product of the generation (regeneration) efficiency Ksc of the clutch motor 30 and the target torque or torque command value Tc* of the clutch motor 30. The target engine speed or revolving speed command value Ne* of the gasoline engine 50 is thus expressed as Equation (5) given above.

After determining the torque command value Te* and the revolving speed command value Ne* of the gasoline engine 50, the control CPU 90 regulates the torque Te and the revolving speed Ne of the gasoline engine 50 to make them approach the respective command values Te* and Ne* at step S384. In accordance with a concrete procedure, the control CPU 90 sends an instruction to the EFIECU 70 through communication to regulate the amount of fuel injection or the throttle valve position. Such regulation makes the torque Te and the revolving speed Ne of the gasoline engine 50 eventually approach the target engine torque Te* and the target engine speed Ne*.

In the third embodiment, both the clutch motor 30 and the assist motor 40 are controlled to regenerate an electric power. The battery 94 is accordingly charged with the regenerating power Wc of the clutch motor 30 and the regenerating power Wa of the assist motor 40. This structure enables the battery 94 to be charged with the electric power greater than the generation capacity of the clutch motor 30.

Figure 17:
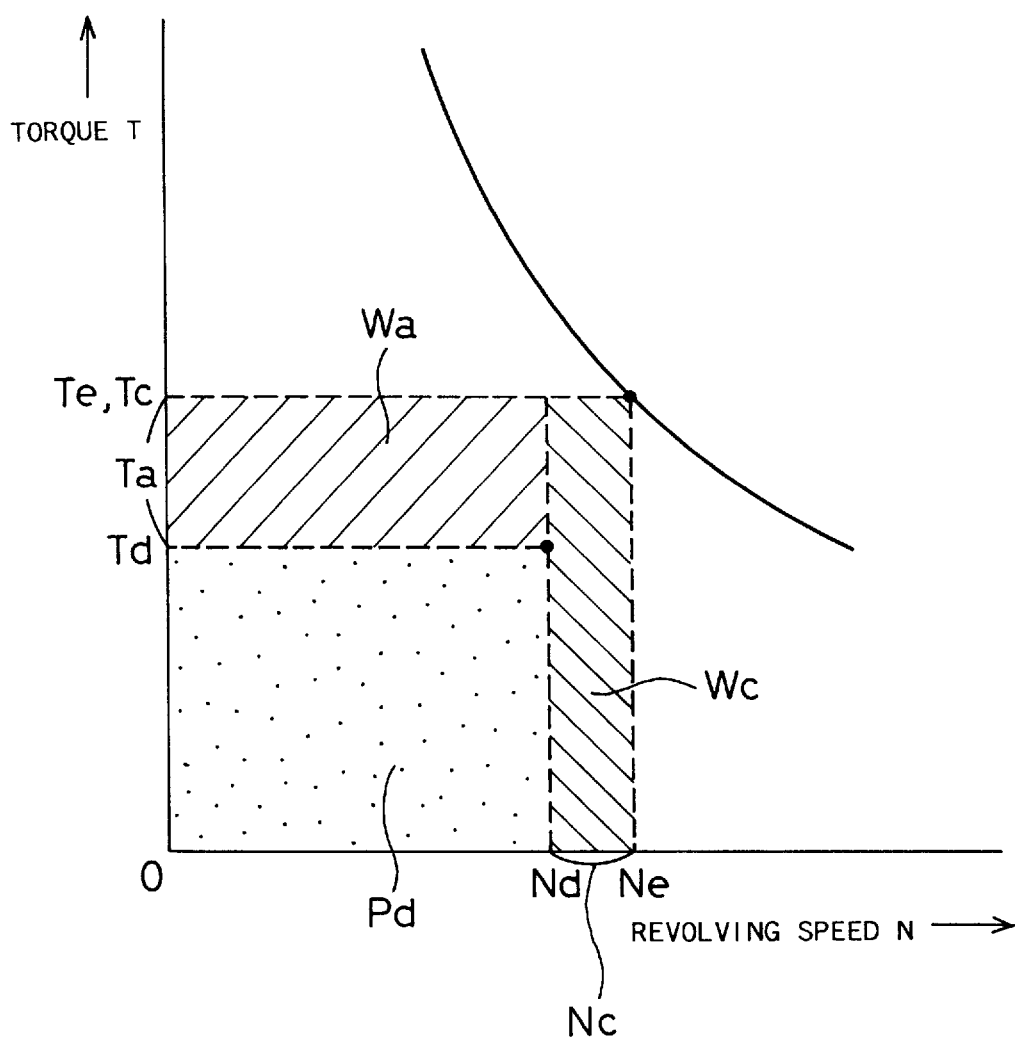
FIG. 17 shows an allocation of the energy supplied by the gasoline engine 50 in the third embodiment.

FIG. 17 shows an allocation of the energy supplied by the gasoline engine 50 in the third embodiment. In the graph of FIG. 17, Td represents the output torque (torque of the drive shaft 22), Nd the revolving speed of the drive shaft 22, Te the torque of the gasoline engine 50 (engine torque), Ne the revolving speed of the gasoline engine 50 (engine speed), Tc the torque of the clutch motor 30, and Ta the torque of the assist motor 40. The energy supplied by the gasoline engine 50 is expressed as (Te×Ne). This energy is divided into the three parts, Pd, Wc, and Wa. Pd represents the output energy of the drive shaft 22, Wc the electric power regenerated by the clutch motor 30 and used to charge the battery 94, Wa the electric power regenerated by the assist motor 40 and used to charge the battery 94.

Figure 18:
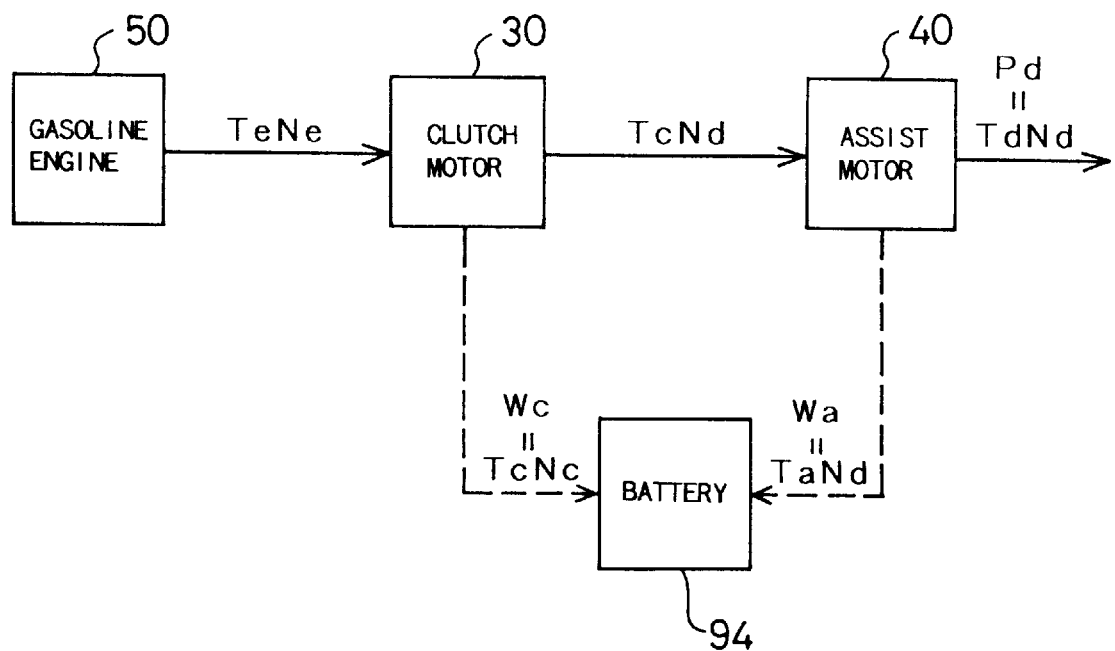
FIG. 18 shows a flow of energy between the gasoline engine 50, the clutch motor 30, the assist motor 40, and the battery 94.

FIG. 18 shows a flow of energy between the gasoline engine 50, the clutch motor 30, the assist motor 40, and the battery 94. Mechanical energy (Te×Ne) produced by the gasoline engine 50 is transmitted to the clutch motor 30. The clutch motor 30 converts part of the mechanical energy transmitted from the gasoline engine 50 to electrical energy (Tc×Nc=Wc) and supplies the electrical energy (Tc×Nc=Wc) to the battery 94. The clutch motor 30 concurrently transmits the residual mechanical energy (Tc×Nd) to the assist motor 40. The assist motor 40 converts part of the mechanical energy (Tc×Nd) transmitted from the clutch motor 30 to electrical energy (Ta×Nd=Wd) and supplies the electrical energy (Ta×Nd=Wd) to the battery 94. The assist motor 40 outputs the residual mechanical energy (Td×Nd=Pd) to the drive shaft. The battery 94 then stores the total of supplied electrical energy (Tc×Nc+Ta×Nd=Wc+Wd).

The power output apparatus 20 of the first embodiment can go into another application given as a fourth embodiment of the present invention. In the first embodiment, the torque of the clutch motor 30 is controlled to balance with the torque of the gasoline engine 50, in order to keep the revolving speed Ne of the gasoline engine 50 at a substantially constant level. The clutch motor 30 can not consequently produce a torque greater than the torque of the gasoline engine 50. In the fourth embodiment, the clutch motor 30 is controlled to produce a torque greater than the torque of the gasoline engine 50 and thereby increase the output torque (torque of the drive shaft 22). In other words, the control of the fourth embodiment increases the torque in the direction of rotation of the drive shaft 22.

The outer rotor 32 of the clutch motor 30, a flywheel (not shown), and other related elements are mechanically linked with the crankshaft 56 of the gasoline engine 50. When the gasoline engine 50 is driven to rotate the crankshaft 56, the crankshaft 56 of the gasoline engine 50 has an energy of rotational motion Per expressed as:

$$\text{Per}=(\tfrac{1}{2})\times Je\times \omega e^2 \propto (\tfrac{1}{2})\times Je\times Ne^2 \qquad (6)$$

wherein Je represents the total moment of inertia of the crankshaft 56, the flywheel, the outer rotor 32, and the other related elements; ωe denotes the angular velocity of the crankshaft 56; and Ne denotes the revolving speed of the crankshaft 56 (revolving speed of the gasoline engine 50).

Equation (6) given above clearly shows that the energy of rotational motion Per does not change as long as the revolving speed Ne of the gasoline engine 50 is fixed. The energy of rotational motion Per is accordingly not consumed in the first embodiment, where the revolving speed Ne of the gasoline engine 50 is kept at a substantially constant level.

The fourth embodiment utilizes the energy of rotational motion Per to produce a torque, which is greater than the torque of the gasoline engine 50, at the drive shaft 22.

Figure 19:
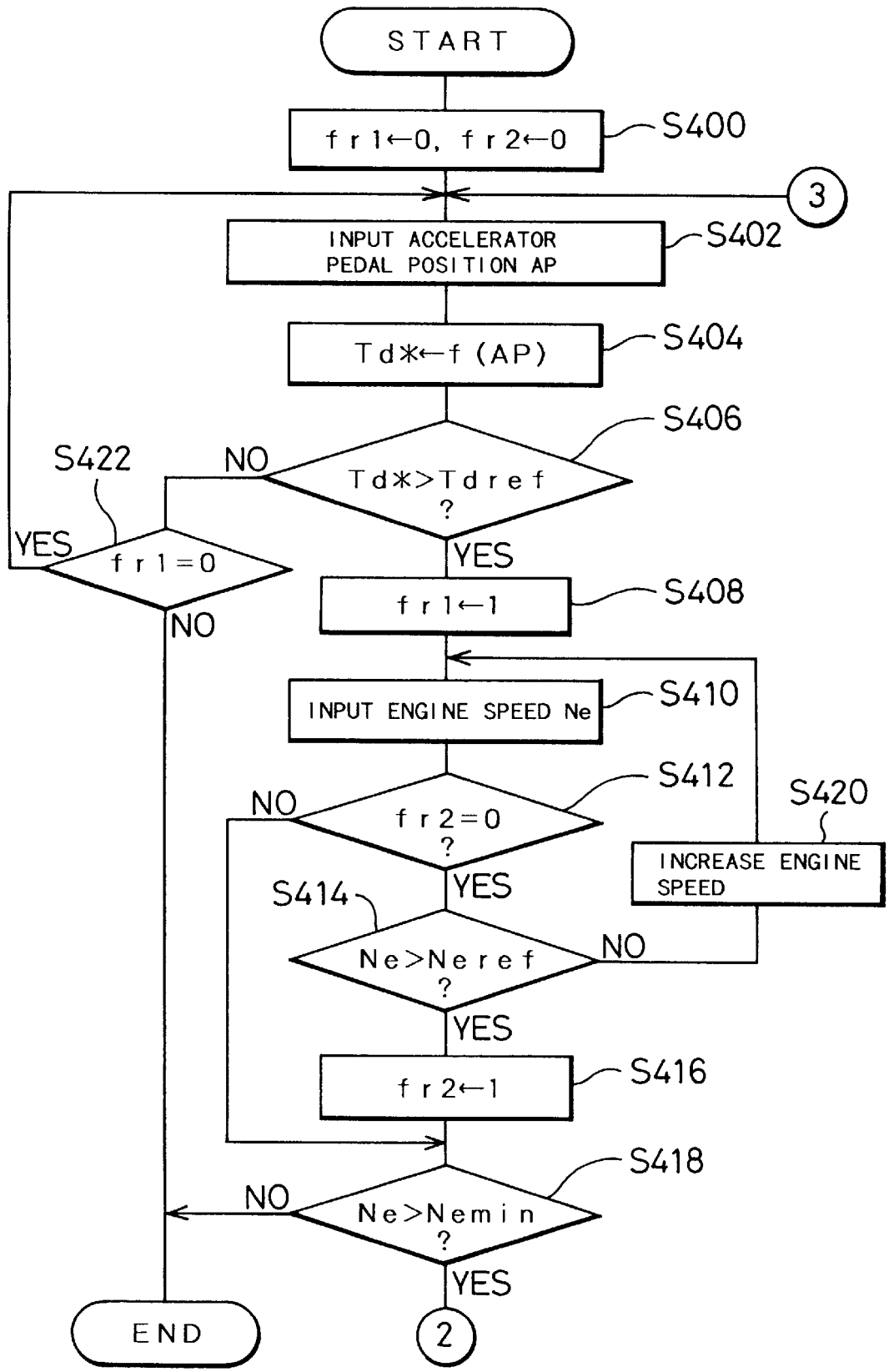
FIGS. 19 and 20 are flowcharts showing a control routine executed in a fourth embodiment of the present invention.

FIGS. 18 and 19 are flowcharts showing essential steps of a control process executed in the fourth embodiment of the invention. When the program enters the control routine of FIG. 19, the control CPU 90 of the controller 80 sets zero flags fr1 and fr2 at step S400 and reads the accelerator pedal position AP from the accelerator position sensor 65 at step S402. The output torque (torque of the drive shaft 22) command value Td* corresponding to the input accelerator pedal position AP is then computed at step S404.

The output torque command value Td* thus determined is compared with a preset reference value Tdref at step S406. When the output torque command value Td* does not exceed the reference value Tdref, the program proceeds to step S422 at which it is determined whether the flag fr1 is equal to '1'. Since the flag fr1 is equal to '0' in this stage, the program returns to step S402. The loop of steps S402 through S406 and S422 is repeatedly executed until the driver steps on the accelerator pedal 64 to a certain depth and the output torque command value Td* exceeds the reference value Tdref.

When the output torque command value Td* exceeds the reference value Tdref at step S406, the program goes to step S408 to set the value '1' in the flag fr1 and to step S410 to receive data of revolving speed Ne of the gasoline engine 50 (engine speed). The input revolving speed Ne of the gasoline engine 50 is substituted into Equation (6), which consequently gives the energy of rotational motion of the gasoline engine 50.

It is then determined at step S412 whether the flag fr2 is equal to '0'. Since the flag fr2 is equal to '0' in this stage, the program proceeds to step S414 at which the input revolving speed Ne of the gasoline engine 50 is compared with a predetermined reference revolving speed Neref. This process determines whether the energy of rotational motion of the gasoline engine 50 is sufficiently greater than a predetermined reference energy of rotational motion (that is, the energy of rotational motion computed from the reference revolving speed Neref according to Equation (6) given above). When the energy of rotational motion of the gasoline engine 50 has not yet exceeded the predetermined reference energy of rotational motion, the gasoline engine 50 is controlled to increase its revolving speed Ne at step S420. In accordance with a concrete procedure, the control CPU 90 sends an instruction to the EFIECU 70 through communication to raise the amount of fuel injection or the throttle valve position, thereby increasing the revolving speed Ne of the gasoline engine 50. Another applicable method controls the clutch motor 30 to carry out the power operation with the electric power stored in the battery 94, thereby enhancing the revolving speed Ne of the crankshaft 56 of the gasoline engine 50. After increasing the revolving speed Ne of the gasoline engine 50, the program returns to step S410. The loop of steps S410 through S414 and S420 is repeatedly executed until the energy of rotational motion of the gasoline engine 50 exceeds the predetermined reference energy of rotational motion.

When the revolving speed Ne of the gasoline engine 50 exceeds the reference revolving speed Neref (that is, when the energy of rotational motion of the gasoline engine 50 exceeds the reference energy of rotational motion) at step S414, the program goes to step S416 to set the value '1' in the flag fr2. The revolving speed Ne of the gasoline engine 50 is then compared with an allowable minimum revolving speed Nemin at step S418. When the revolving speed Ne of the gasoline engine 50 exceeds the allowable minimum revolving speed Nemin at step S418, the program goes to step S424 in the flowchart of FIG. 19.

The control CPU 90 receives data of energy Pe generated by the gasoline engine 50 (engine-based energy) at step S424. In accordance with a concrete procedure, a specific operation based on the amount of fuel injection per unit time in the gasoline engine 50 gives the engine-based energy Pe. At subsequent step S426, the torque Te produced by the gasoline engine 50 (engine torque) is calculated from the engine-based energy Pe and the engine speed Ne according to the equation given as:

$Te = Pe/Ne$

This shows the torque Te of the gasoline engine 50 at the current moment.

The torque command value Tc* of the clutch motor 30 is set with the engine torque Te thus determined at step S428. In order to enable the clutch motor 30 to produce a torque greater than the torque of the gasoline engine 50, it is required to set the torque command value Tc* of the clutch motor 30 to a greater value than the torque Te of the gasoline engine 50 computed at step S426.

After setting the torque command value Tc* of the clutch motor 30 at step S428, the program proceeds to step S430 to control the clutch motor 30 and then to step S432 to control the assist motor 40. Like the flowchart of FIG. 6, as a matter of convenience of illustration, the control operations of the clutch motor 30 and the assist motor 40 are shown as separate steps in the flowchart of FIG. 19. In the actual procedure, however, these control operations are carried out comprehensively. For example, the control CPU 90 implements the control of the clutch motor 30 and the assist motor 40 simultaneously by utilizing the interrupt process. The control of the clutch motor 30 and the assist motor 40 follows the flowcharts of FIGS. 7 through 9 discussed above.

Figure 20:
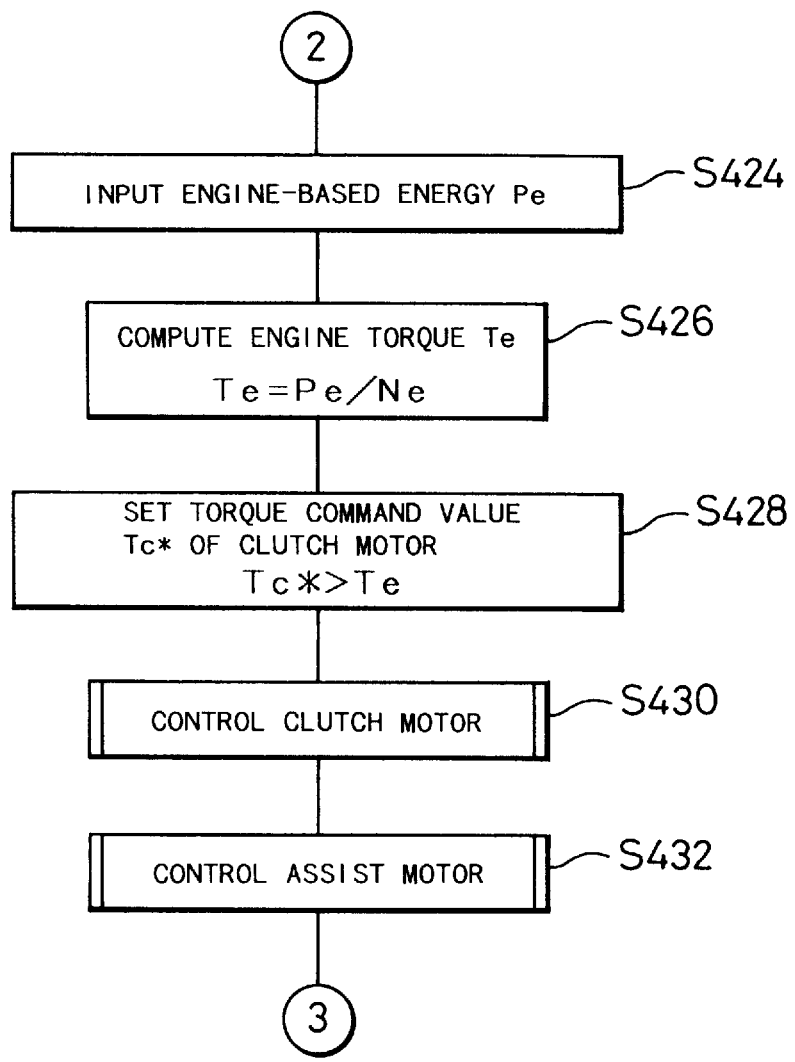
Figure 21A:
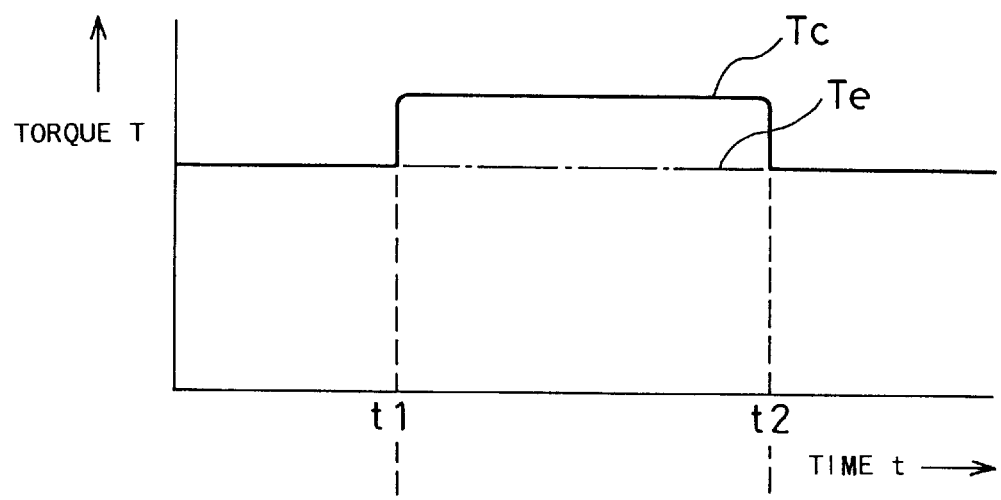
FIGS. 21(a) and 21(b) are characteristic diagrams showing variations in torque Te and revolving speed Ne of the gasoline engine 50 and in torque Tc of the clutch motor 30 with respect to time when the control process of FIGS. 18 and 19 is implemented.
Figure 21B:
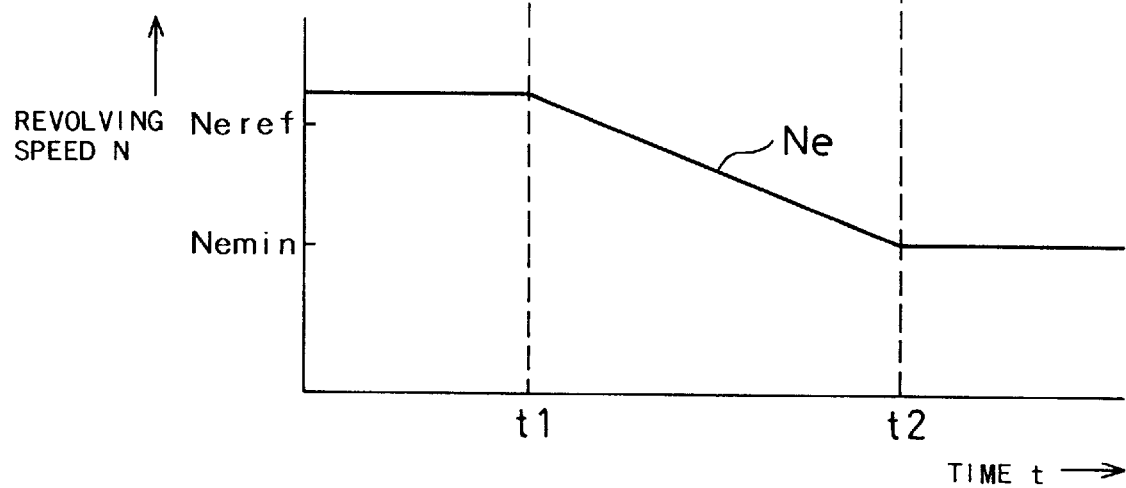

FIGS. 20(a) and 21(b) are characteristic diagrams showing variations in torque Te and revolving speed Ne of the gasoline engine 50 and in torque Tc of the clutch motor 30 with respect to time when the control process of FIGS. 18 and 19 is implemented. FIG. 21(a) shows the time-courses of the engine torque Te and the clutch motor torque Tc, and FIG. 21(b) shows the time course of the engine speed Ne. The revolving speed Ne of the gasoline engine 50 gradually decreases in a specific time period t1–t2 (between time points t1 and t2), when the clutch motor 30 produces the greater torque Tc than the torque Te of the gasoline engine 50. In the specific time period t1–t2, the energy of rotational motion Per of the gasoline engine 50 is consumed as clearly shown by Equation (6) discussed above.

The decrease in revolving speed Ne of the gasoline engine 50 is ascribed to the fact that the greater clutch motor torque Tc than the engine torque Te applies an acceleration in the reverse of rotation of the crankshaft 56 (that is, deceleration) to the crankshaft 56 of the gasoline engine 50.

The decrease in revolving speed Ne of the gasoline engine 50 can be expressed as a decrease in angular velocity ωe of the crankshaft 56 of the gasoline engine 50, which is given as:

$$\omega e = \omega_e 0 - \int_{t0}^{t} \frac{Te - Tc - Tfe}{Je} dt \quad (7)$$

wherein ωe0 denotes an initial angular velocity of the crankshaft 56 of the gasoline engine 50, and Tfe a frictional torque applied to the crankshaft 56 of the gasoline engine 50. Note that the above discussion based on the drawings of FIGS. 18 through 20 has ignored the frictional torque.

When the torque Tc of the clutch motor 30 satisfies the expression Te=Tc+Tfe, the second term of the right side in Equation (7) becomes equal to zero. This means that ωe=ωe0 and the angular velocity we of the crankshaft 56 is fixed. When the torque Tc of the clutch motor 30 is greater than the torque Te of the gasoline engine 50 and satisfies the expression Te<Tc+Tfe, on the contrary, the second term of the right side in Equation (7) increases with the time 't' and thereby the angular velocity ωe of the crankshaft 56 gradually decreases.

After the control of the clutch motor 30 and the assist motor 40 at steps S430 and S432 in the flowchart of FIG. 20, the program returns to step S402 in the flowchart of FIG. 19 to repeat the processing described above. Since the value '1' has already been set in the flag fr2 at step S416 in the previous cycle, the negative answer at step S412 makes the program skip the processing of step S414 and subsequent steps and directly go to step S418 in this cycle. In this stage, even when the revolving speed Ne of the gasoline engine 50 has decreased to or below the reference revolving speed Neref as shown in FIG. 21(b), the processing of step S420 is not carried out to increase the revolving speed Ne of the gasoline engine 50.

As the processing proceeds, the revolving speed Ne of the gasoline engine 50 gradually decreases to the allowable minimum revolving speed Nemin. When the revolving speed Ne of the gasoline engine 50 becomes equal to or lower than the allowable minimum revolving speed Nemin, the gasoline engine 50 can not keep its rotation. In such a case, the negative answer at step S418 immediately stops the processing and enables the gasoline engine 50 to continue its rotation. The allowable minimum revolving speed Nemin is, for example, an idling speed. When the driver releases the accelerator pedal 64 while the revolving speed Ne of the gasoline engine 50 gradually decreases, the output torque command value Td* becomes equal to or less than the reference value Tdref. The negative answer at step S406 makes the program proceed to step S422. Since the value '1' has already been set in the flag fr1 at step S408 in the previous cycle, the negative answer at step S422 does not make the program return to step S402 but terminates the processing.

With a gradual decrease in revolving speed Ne of the gasoline engine 50, the difference between the engine speed Ne and the revolving speed Nd of the drive shaft 22 gradually decreases to zero. After that, the revolving speed Nd of the drive shaft 22 exceeds the revolving speed Ne of the gasoline engine 50. As discussed previously, the difference between the revolving speed Ne of the gasoline engine 50 and the revolving speed Nd of the drive shaft 22 is equal to the revolving speed Nc of the clutch motor 30. The variation in revolving speed difference accordingly changes the operating condition of the clutch motor 30. In the process of decreasing the revolving speed Ne of the gasoline engine 50 to make the revolving speed difference (Ne–Nd) equal to zero, the clutch motor 30 carries out the regenerative operation. At the time point when the revolving speed difference (Ne–Nd) is equal to zero, the clutch motor 30 is in the lock-up position and stops rotation as a motor. When the revolving speed Ne of the gasoline engine 50 further decreases to make the negative revolving speed difference (Ne–Nd), the vehicle falls in the over-drive position (Ne<Nd) as discussed previously and the clutch motor 30 carries out the power operation. The electric power regenerated through the regenerative operation of the clutch motor 30 is consumed by the assist motor 40 or stored in the battery 94. The electric power consumed for the power operation of the clutch motor 30 is supplied from the battery 94 or with the regenerated power of the assist motor 40.

As discussed above, the structure of the fourth embodiment enables the clutch motor 30 to produce a torque greater than the torque of the gasoline engine 50. This can effectively increase the output torque (increases the torque in the direction of rotation of the drive shaft 22) both in the state of assist control and in the state of power assist control.

In the fourth embodiment, the torque Te produced by the gasoline engine 50 (engine torque) is computed by dividing the engine-based energy Pe by the engine speed Ne. The clutch motor 30 is then controlled to produce the torque Tc greater than the torque Te of the gasoline engine 50 thus computed. The present invention is, however, not restricted to this procedure. Another possible method reads only the revolving speed Ne of the gasoline engine 50 and controls the torque Tc of the clutch motor 30 to decrease the revolving speed Ne of the gasoline engine 50, that is, to decrease the energy of rotational motion Per of the crankshaft 56 of the gasoline engine 50. Still another applicable method detects the total torque applied to the crankshaft 56 with a strain gauge attached to the crankshaft 56 and controls the torque Tc of the clutch motor 30 to make the total torque smaller than zero. The total torque corresponds to the difference (Te−Tc) between the torque Te of the gasoline engine 50 and the torque Tc of the clutch motor 30.

As clearly shown in Equation (6) discussed above, the energy of rotational motion Per of the crankshaft 56 is proportional to the moment of inertia Je. The energy of rotational motion Per of the crankshaft 56 can thus be enhanced by increasing the size or weight of the flywheel or the outer rotor 32 mechanically linked with the crankshaft 56 of the gasoline engine 50 or adding another weight to the crankshaft 56 to increase the moment of inertia Je. This effectively extends the specific time period t1–t2 shown in FIG. 21(b), during which the revolving speed Ne of the gasoline engine 50 gradually decreases to the allowable minimum revolving speed Nemin.

Another applicable method reads the torque Tc of the clutch motor 30 or the revolving speed Ne of the gasoline engine 50 and occasionally informs the driver of the input data. In this structure, the driver determines the timing of torque-up operation that makes the torque Tc of the clutch motor 30 greater than the torque Te of the gasoline engine 50.

Although the power output apparatus 20 of the first embodiment is applied to the fourth embodiment, other power output apparatuses of different structures may also be applicable. The process of making the torque Tc of the clutch motor 30 greater than the torque Te of the gasoline engine 50 essentially requires the clutch motor 30 and the gasoline engine 50. For this process, neither the assist motor 40 nor the battery 94 is an essential component. The regenerative operation of the clutch motor 30, however, requires some means for absorbing the regenerated power, and the power operation of the clutch motor 30 requires some means for supplying the electric power to the clutch motor 30. Electrical equipment (for example, lighting facilities, sound facilities, and cooling facilities) mounted on the vehicle other than the assist motor 40 and the battery 94 may be applied to the means for absorbing the regenerated power.

There may be many other modifications, alternations, and changes without departing from the scope or spirit of essential characteristics of the invention. It is thus clearly understood that the above embodiments are only illustrative and not restrictive in any sense. Some examples of modification are given below.

In the structure of the power output apparatus 20 shown in FIG. 1, the clutch motor 30 and the assist motor 40 are separately attached to the different positions of the drive shaft 22. Like a modified power output apparatus 20A illustrated in FIG. 22, however, the clutch motor and the assist motor may integrally be joined with each other. A clutch motor 30A of the power output apparatus 20A includes an inner rotor 34 connecting with the crankshaft 56 and an outer rotor 32A linked with the drive shaft 22. Three-phase coils 36 are attached to the inner rotor 34, and permanent magnets 35A are set on the outer rotor 32A in such a manner that the outer surface and the inner surface thereof have different magnetic poles. An assist motor 40A includes the outer rotor 32A of the clutch motor 30A and a stator 43 with three-phase coils 44 mounted thereon. In this structure, the outer rotor 32A of the clutch motor 30A also works as a rotor of the assist motor 40A. Since the three-phase coils 36 are mounted on the inner rotor 34 connecting with the crankshaft 56, a rotary transformer 38 for supplying electric power to the three-phase coils 36 of the clutch motor 30A is attached to the crankshaft 56.

In the power output apparatus 20A, the voltage applied to the three-phase coils 36 on the inner rotor 34 is controlled against the inner-surface magnetic pole of the permanent magnets 35A set on the outer rotor 32A. This allows the clutch motor 30A to work in the same manner as the clutch motor 30 of the power output apparatus 20 shown in FIG. 1. The voltage applied to the three-phase coils 44 on the stator 43 is controlled against the outer-surface magnetic pole of the permanent magnets 35A set on the outer rotor 32A. This allows the assist motor 40A to work in the same manner as the assist motor 40 of the power output apparatus 20. The control procedures discussed as the first through the third embodiments above are applicable to the power output apparatus 20A shown in FIG. 22, which accordingly exerts the same effects as those of the power output apparatus 20 shown in FIG. 1.

Figure 22:
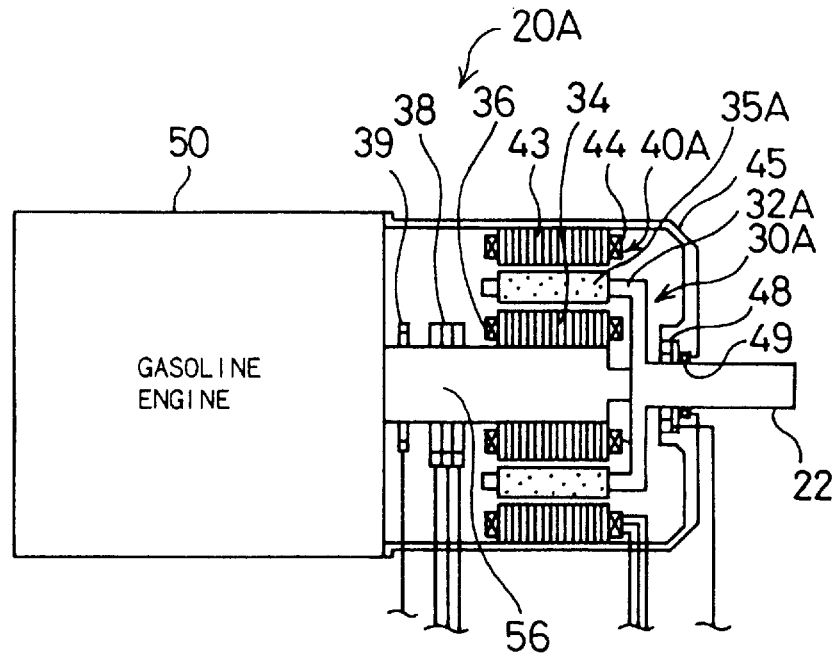
FIG. 22 is a schematic view illustrating an essential part of another power output apparatus 20A as a modification of the invention.

In the power output apparatus 20A of FIG. 22, the clutch motor 30A and the assist motor 40A are integrally joined with each other, which shortens the length of the power output apparatus 20A along the drive shaft 22. The outer rotor 32A functions concurrently as one of the rotors in the clutch motor 30A and as the rotor of the assist motor 40A, thereby effectively reducing the size and weight of the whole power output apparatus 20A.

The modified structure that the outer rotor 32A works as one of the rotors in the clutch motor 30A and as the rotor of the assist motor 40A causes the clutch motor 30A and the assist motor 40A to magnetically interfere with each other and thereby have adverse effects on each other. In order to prevent the large magnetic interference, the outer rotor 32A may be constructed as a double-cylinder structure including two concentric cylinders. One of the cylinders is assigned to the rotor of the clutch motor 30A, and the other to the rotor of the assist motor 40A. The two cylinders apart from each other by a predetermined distance are connected to the drive shaft 22. A magnetic shielding member for blocking the magnetic lines of force is also effective for preventing the magnetic interference.

Figure 23:
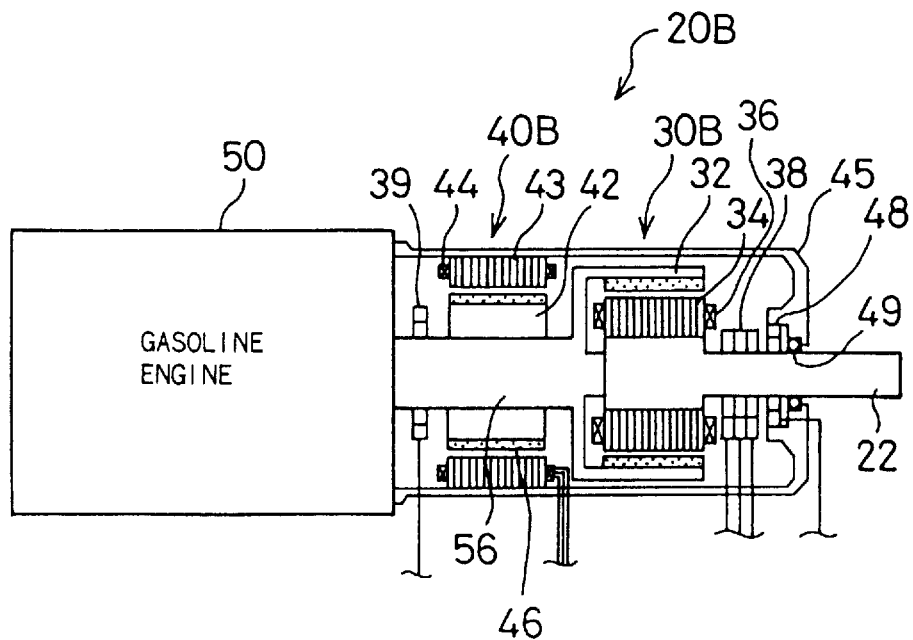
FIG. 23 is a schematic view illustrating an essential part of still another power output apparatus 20B as another modification of the invention.

Although the assist motor 40 is attached to the drive shaft 22 in the power output apparatus 20 of FIG. 1, the assist motor may be attached to the crankshaft 56 of the gasoline engine 50 like another power output apparatus 20B shown in FIG. 23.

The power output apparatus 20B of FIG. 23 has a similar structure to that of the power output apparatus 20 of FIG. 1, except that an assist motor 40B is attached to the crankshaft 56 placed between the gasoline engine 50 and a clutch motor 30B. In the power output apparatus 20B of FIG. 23, like elements as those of the power output apparatus 20 of FIG. 1 are shown by like numerals or symbols and are not explained here. The symbols used in the description have like meanings unless otherwise specified.

The following describes operation of the power output apparatus 20B shown in FIG. 23. By way of example, it is assumed that the gasoline engine 50 is driven with a torque Te and at a revolving speed Ne. When a torque Ta is added to the crankshaft 56 by the assist motor 40B linked with the crankshaft 56, the sum of the torques (Te+Ta) consequently acts on the crankshaft 56. When the clutch motor 30B is controlled to produce the torque Tc equal to the sum of the torques (Te+Ta), the torque Tc (=Te+Ta) is transmitted to the drive shaft 22.

When the revolving speed Ne of the gasoline engine 50 is greater than the revolving speed Nd of the drive shaft 22 (Ne>Nd), the clutch motor 30B regenerates an electric power based on the revolving speed difference Nc between the revolving speed Ne of the gasoline engine 50 and the revolving speed Nd of the drive shaft 22. The regenerated power is supplied to the assist motor 40B via the first and the second driving circuits 91 and 92, so as to activate the assist motor 40B. Provided that the torque Ta of the assist motor 40B is substantially equivalent to the electric power regenerated by the clutch motor 30B, free torque conversion is allowed for the energy output from the gasoline engine 50 within a range holding the relationship of Equation (8) given below. Since the relationship of Equation (8) represents the ideal state with an efficiency of 100%, (Tc×Nd) is a little smaller than (Te×Ne) in the actual state.

$$Te \times Ne = Tc \times Nd \tag{8}$$

Figure 24:
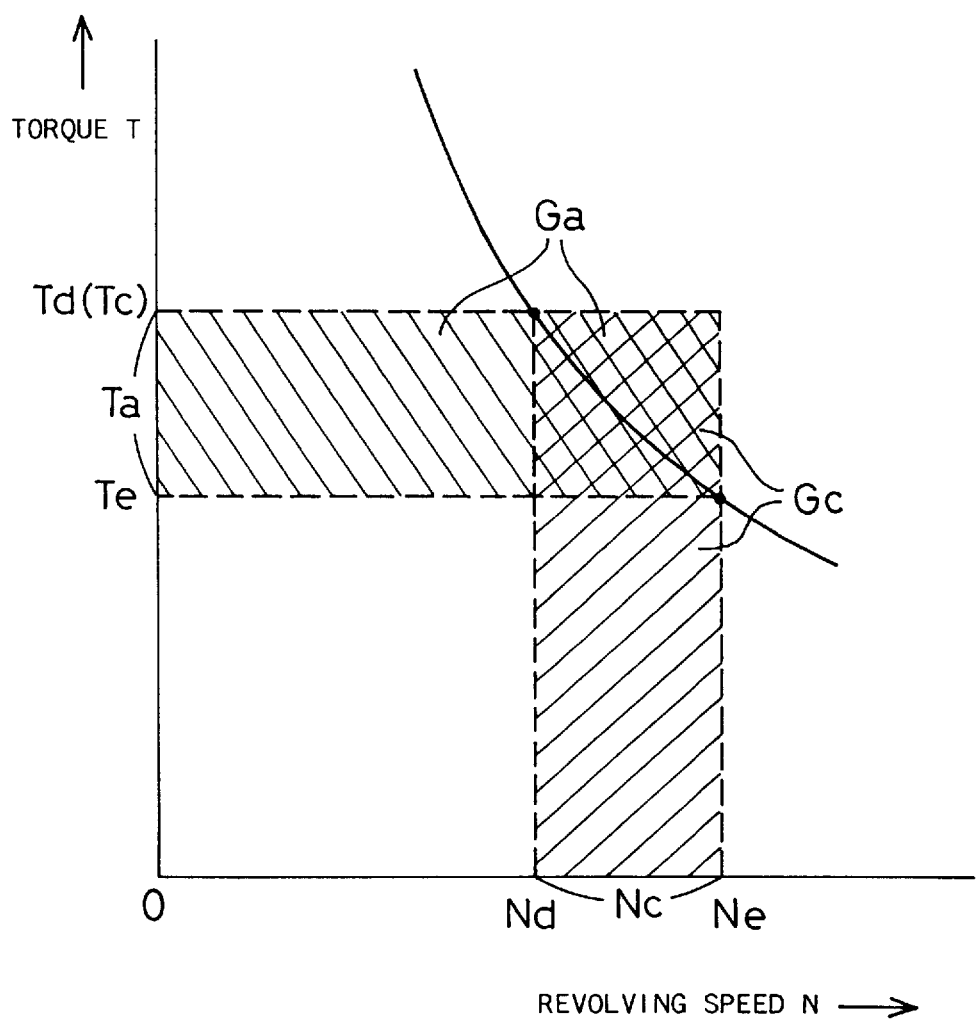
FIG. 24 is a graph schematically showing an amount of energy regenerated by the clutch motor 30B and that consumed by the assist motor 40B in the modified structure of FIG. 23.

FIG. 24 is a graph schematically showing an amount of energy regenerated by the clutch motor 30B and that consumed by the assist motor 40B. In the example of FIG. 24, the crankshaft 56 of the gasoline engine 50 is driven at a revolving speed Ne and a torque Te, whereas the drive shaft 22 is rotated at a revolving speed Nd and a torque Td. The clutch motor 30B regenerates electrical energy in a region Gc as an electric power. The regenerated power is supplied to the assist motor 40B as electrical energy in a region Ga, which is consumed by the assist motor 40B.

When the revolving speed Ne of the gasoline engine 50 is lower than the revolving speed Nd of the drive shaft 22 (Ne<Nd), the clutch motor 30 functions as a normal motor. The clutch motor 30 accordingly enhances the speed of rotation of the inner rotor 34 relative to the outer rotor 32. Provided that the torque Ta of the assist motor 40B is set to a negative value to enable the assist motor 40B to regenerate a power substantially equivalent to the electrical energy consumed by the clutch motor 30B, free torque conversion is also allowed for the energy output from the gasoline engine 50 within the range holding the relationship of Equation (8) given above.

With only a little modification, the control procedures discussed as the first through the third embodiments above are also applicable to the power output apparatus 20B shown in FIG. 23, which accordingly exerts the same effects as those of the power output apparatus 20 shown in FIG. 1. The required modification of the control procedures is described briefly.

When the control procedure of the first embodiment is executed by the power output apparatus 20 of FIG. 1, the torque command value Tc* of the clutch motor 30 is set equal to the target engine torque Te* at step S106 in the flowchart of FIG. 6. In the power output apparatus 20B of FIG. 23, however, the torque command value Tc* of the clutch motor 30B should be set equal to the output torque command value Td* at step S106.

When the control procedure of the third embodiment is executed by the power output apparatus 20 of FIG. 1, the torque command value Ta* of the assist motor 40 is determined at step S340 in the flowchart of FIG. 14 by the calculation expressed as:

$$Ta^* = -\{Wa/(Ksa \times Nd)\}$$

In the power output apparatus 20B of FIG. 23, the calculation should be changed to:

$$Ta^* = -\{Wa/(Ksa \times Ne)\}$$

The torque command value Tc* of the clutch motor 30 is determined at step S360 in the flowchart of FIG. 15 by the calculation expressed as:

$$Tc^* = Td^* - Ta^*$$

In the power output apparatus 20B, however, the torque command value Tc* of the clutch motor 30B should be set equal to the output torque command value Td*. The torque command value Te* of the gasoline engine 50 is set equal to the torque command value Tc* of the clutch motor 30 at step S380 in the flowchart of FIG. 16. In the power output apparatus 20B, however, the torque command value Te* of the gasoline engine 50 should be determined by the calculation expressed as:

$$Te^* = Ta^* + Tc^*$$

As discussed above, with only a little modification of control procedures, the power output apparatus 20B of FIG. 23 realizes the same operations and effects as those of the power output apparatus 20 of FIG. 1.

The control procedure of the fourth embodiment can be executed in the following manner. In the power output apparatus 20B of FIG. 23, in order to keep the revolving speed Ne of the gasoline engine 50 at a substantially constant level, the torque Tc of the clutch motor 30B is controlled to be equal to the sum of the torque Te of the gasoline engine 50 and the torque Ta of the assist motor 40B. When the fourth embodiment is realized by the power output apparatus 20B, the clutch motor 30B is controlled to apply to the crankshaft 56 the torque Tc, which is greater than the sum of the torque Te of the gasoline engine 50 and the torque Ta of the assist motor 40B and acts in the reverse of the torque Te of the gasoline engine 50. The sum of the torques applied to the crankshaft 56 accordingly acts in the reverse of rotation of the crankshaft 56. This applies the deceleration to the crankshaft 56 and thereby decreases the revolving speed Ne of the gasoline engine 50 and the energy of rotational motion Per of the crankshaft 56. When the clutch motor 30B applies to the crankshaft 56 the torque Tc greater than the sum of the torque Te of the gasoline engine 50 and the torque Ta of the assist motor 40B, the torque greater than the sum of the torques Te and Ta is produced as a reaction on the drive shaft 22 in the direction of the torque Te of the gasoline engine 50. This increases the output torque (torque of the drive shaft 22) and accordingly realizes the similar effect to that of the fourth embodiment.

Figure 25:
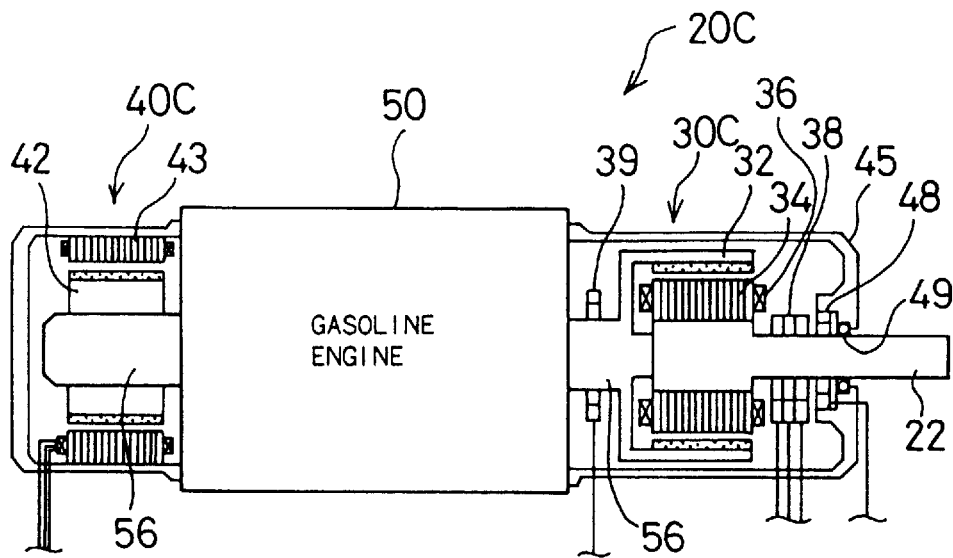
FIG. 25 is a schematic view illustrating an essential part of another power output apparatus 20C as still another modification of the invention.

In the power output apparatus 20B of FIG. 23, the assist motor 40B is attached to the crankshaft 56 placed between the gasoline engine 50 and the clutch motor 30B. Like another power output apparatus 20C illustrated in FIG. 25, however, the gasoline engine 50 may be interposed between a clutch motor 30C and an assist motor 40C attached to the crankshaft 56. The modified control procedures for the power output apparatus 20B of FIG. 23 are applicable to the power output apparatus 20C, which accordingly realizes the same operations and effects.

In the power output apparatus 20B of FIG. 23, the clutch motor 30B and the assist motor 40B are separately linked with the crankshaft 56. Like a power output apparatus 20D shown in FIG. 26, however, a clutch motor 30D and an assist motor 40D may be joined integrally with each other. The clutch motor 30D of the power output apparatus 20D includes an outer rotor 32D connecting with the crankshaft 56 and an inner rotor 34 linked with the drive shaft 22. Three-phase coils 36 are attached to the inner rotor 34, and permanent magnets 35D are set on the outer rotor 32D in such a manner that the outer surface and the inner surface thereof have different magnetic poles. The assist motor 40D includes the outer rotor 32D of the clutch motor 30D and a stator 43 with three-phase coils 44 mounted thereon. In this structure, the outer rotor 32D of the clutch motor 30D also works as a rotor of the assist motor 40D.

In the power output apparatus 20D, the voltage applied to the three-phase coils 36 on the inner rotor 34 is controlled against the inner-surface magnetic pole of the permanent magnets 35D set on the outer rotor 32D. This allows the clutch motor 30D to work in the same manner as the clutch motor 30B of the power output apparatus 20B shown in FIG. 23. The voltage applied to the three-phase coils 44 on the stator 43 is controlled against the outer-surface magnetic pole of the permanent magnets 35D set on the outer rotor 32D. This allows the assist motor 40D to work in the same manner as the assist motor 40B of the power output apparatus 20B. The modified control procedures of the first through the fourth embodiments discussed above are applicable to the power output apparatus 20D shown in FIG. 26, which accordingly exerts the same effects as those of the power output apparatus 20B shown in FIG. 23.

Figure 26:
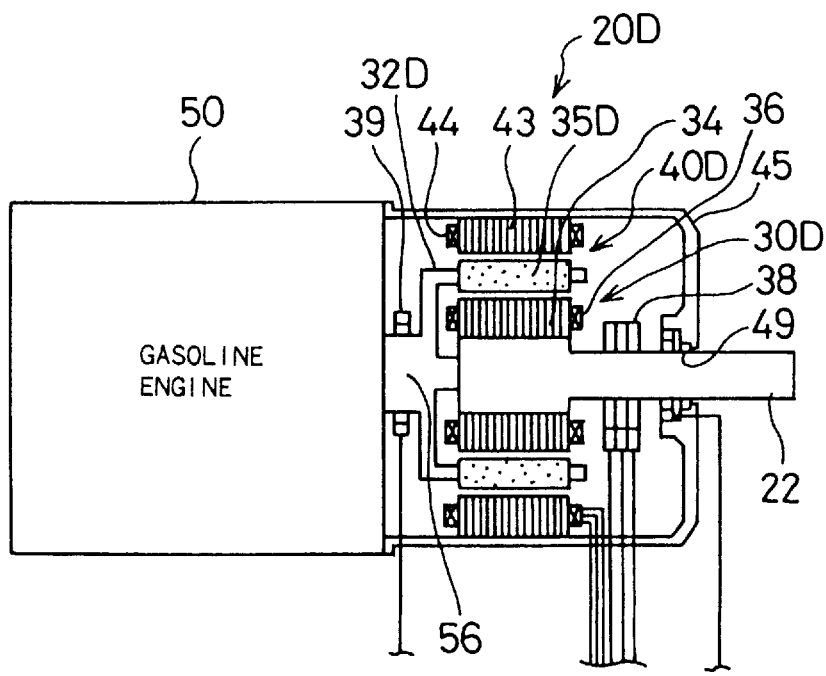
FIG. 26 is a schematic view illustrating an essential part of still another power output apparatus 20D as another modification of the invention.

Like the power output apparatus 20A of FIG. 22, in the power output apparatus 20D of FIG. 26, the clutch motor 30D and the assist motor 40D are integrally joined with each other, which shortens the length of the power output apparatus 20D along the drive shaft 22. The outer rotor 32D functions concurrently as one of the rotors in the clutch motor 30D and as the rotor of the assist motor 40D, thereby effectively reducing the size and weight of the whole power output apparatus 20D.

Figure 27:
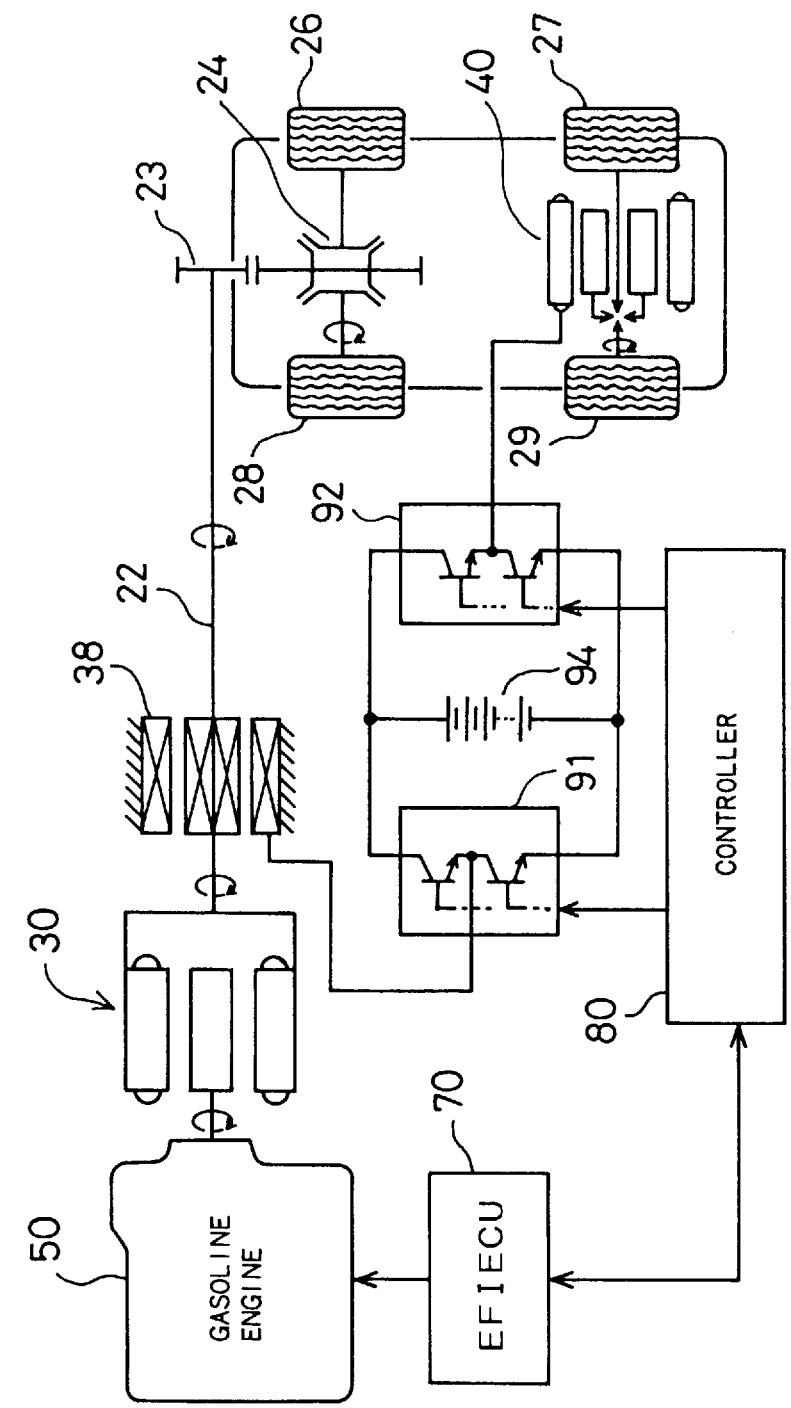
FIG. 27 shows application of the power output apparatus 20 of FIG. 1 to a vehicle with a four-wheel drive.

The power output apparatus 20 of FIG. 1 is also applicable to the vehicle with a four-wheel drive (4WD) as shown in FIG. 27. In the structure of FIG. 27, the assist motor 40, which is mechanically linked with the drive shaft 22 in the structure of FIG. 1, is separated from the drive shaft 22 and independently disposed in a rear-wheel portion of the vehicle in order to drive rear driving wheels 27 and 29. One end of the drive shaft 22 is linked with a differential gear 24 via a gear 23 in order to drive front driving wheels 26 and 28.

The control procedures of the first through the fourth embodiments discussed above can also be realized by this modified structure. For example, in accordance with the control procedure of the first embodiment, the assist motor 40 receives an electric power regenerated by the clutch motor 30 and produces a torque which is transmitted to the rear-wheel portion. The torque transmitted via the clutch motor 30 is further transmitted via the differential gear 24 to the front-wheel portion. In accordance with the control procedure of the second embodiment, the assist motor 40 receives the electric power stored in the battery 94 in addition to the power regenerated by the clutch motor 30 to produce an assist torque. In accordance with the control procedure of the third embodiment, the battery 94 is charged with the electric power regenerated by the assist motor 40 arranged in the rear-wheel portion as well as with the electric power regenerated by the clutch motor 30. In accordance with the control procedure of the fourth embodiment, the clutch motor 30 is controlled by utilizing the energy of rotational motion of the gasoline engine 50 in order to apply the torque, which is greater than the torque of the gasoline engine 50, to the drive shaft 22.

The gasoline engine 50 driven by means of gasoline is used as the engine in the above power output apparatuses. The principle of the invention is, however, applicable to other internal combustion engines and external combustion engines, such as Diesel engines, turbine engines, and jet engines.

Permanent magnet (PM)-type synchronous motors are used for the clutch motor 30 and the assist motor 40 in the power output apparatuses described above. Other motors such as variable reluctance (VR)-type synchronous motors, vernier motors, d.c. motors, induction motors, and superconducting motors may be used for both the regenerative operation and power operation, while stepping motors are applicable only for the power operation.

In the power output apparatus described above, the outer rotor 32 of the clutch motor 30 is linked with the crankshaft 56, whereas the inner rotor 34 is connected to the drive shaft 22. Alternatively, the outer rotor 32 may be linked with the drive shaft 22 and the inner rotor 34 with the crankshaft 56. Disk rotors facing each other may be used instead of the outer rotor 32 and the inner rotor 34.

The rotary transformer 38 used as means for transmitting electric power to the clutch motor 30 may be replaced by a slip ring-brush contact, a slip ring-mercury contact, a semiconductor coupling of magnetic energy, or the like.

In the above power output apparatus, transistor inverters are used for the first and the second driving circuits 91 and 92. Other examples applicable to the driving circuits 91 and 92 include IGBT (insulated gate bipolar mode transistor) inverters, thyristor inverters, voltage PWM (pulse width modulation) inverters, square-wave inverters (voltage inverters and current inverters), and resonance inverters.

The battery 94 may include Pb cells, NIMH cells, Li cells, or the like cells. A capacitor may be used in place of the battery 94.

Although the power output apparatus is mounted on the vehicle in the above embodiments, it may be mounted on other transportation means like ships and airplanes as well as a variety of industrial machines.

The scope and spirit of the present invention are limited only by the terms of the appended claims.

What is claimed is:

1. A power output apparatus for outputting power to a drive shaft, said power output apparatus comprising:

an engine having an output shaft;

a first motor comprising a first rotor connected with said output shaft of said engine and a second rotor connected with said drive shaft, said second rotor being coaxial to and rotatable relative to said first rotor, said first and second rotors being electromagnetically coupled with each other, whereby power is transmitted between said output shaft of said engine and said drive shaft via the electromagnetic coupling of said first and second rotors;

first motor-driving means for exchanging polyphase electric currents with said first motor to vary the electromagnetic coupling of said first rotor with said second rotor;

a second motor comprising a stator and a third rotor connected with said drive shaft, said stator being electromagnetically coupled with said third rotor;

second motor-driving means for exchanging electric currents with said second motor to vary the electromagnetic coupling of said stator with said third rotor; and control means for controlling said first motor-driving means to enable said first motor to regenerate electric power, and controlling said second motor-driving means to supply the regenerated electric power to said second motor to drive said second motor.

2. A power output apparatus in accordance with claim 1, wherein said third rotor is mounted on said second rotor connected with said drive shaft.

3. A power output apparatus in accordance with claim 2, said power output apparatus further comprising:

storage means for storing at least part of the regenerated electric power.

4. A power output apparatus in accordance with claim 1, said power output apparatus further comprising:

storage means for storing at least part of the regenerated electric power.

5. A power output apparatus in accordance with claim 1, wherein said first motor-driving means comprises an inverter.

6. A power output apparatus for outputting power to a drive shaft, said power output apparatus comprising:

an engine having an output shaft;

a first motor comprising a first rotor connected with said output shaft of said engine and, a second rotor connected with said drive shaft, said second rotor being coaxial to and rotatable relative to said first rotor, said first and second rotors being electromagnetically coupled with each other, whereby power is transmitted between said output shaft of said engine and said drive shaft via the electromagnetic coupling of said first and second rotors;

first motor-driving means for exchanging electric currents with said first motor to vary the electromagnetic coupling of said first rotor with said second rotor;

a second motor comprising a stator and a third rotor connected with said output shaft of said engine, said stator being electromagnetically coupled with said third rotor;

second motor-driving means for exchanging electric currents with said second motor to vary the electromagnetic coupling of said stator with said third rotor; and control means for controlling said first motor-driving means to enable said first motor to regenerate electric power, and controlling said second motor-driving means to supply the regenerated electric power to said second motor to drive said second motor.

7. A power output apparatus in accordance with claim 6, wherein said third rotor is mounted on said first rotor connected with said output shaft of said engine.

8. A power output apparatus in accordance with claim 7, said power output apparatus further comprising:

storage means for storing at least part of the regenerated electric power.

9. A power output apparatus in accordance with claim 6, said power output apparatus further comprising:

storage means for storing at least part of the regenerated electric power.

10. A power output apparatus for outputting power to a drive shaft, said power output apparatus comprising:

an engine having an output shaft;

a first motor comprising a first rotor connected with said output shaft of said engine and a second rotor connected with said drive shaft, said second rotor being coaxial to and rotatable relative to said first rotor, said first and second rotors being electromagnetically coupled with each other, whereby power is transmitted between said output shaft of said engine and said drive shaft via the electromagnetic coupling of said first and second rotors;

first motor-driving means for exchanging electric currents with said first motor to vary the electromagnetic coupling of said first rotor with said second rotor;

a second motor comprising a stator and a third rotor connected with said drive shaft, said stator being electromagnetically coupled with said third rotor;

second motor-driving means for exchanging electric currents with said second motor to vary the electromagnetic coupling of said stator with said third rotor; and control means for controlling said first motor-driving means to enable said first motor to regenerate electric power, and controlling said second motor-driving means to enable said second motor to regenerate electric power.

11. A power output apparatus in accordance with claim 1, wherein said third rotor is mounted on said second rotor connected with said drive shaft.

12. A power output apparatus in accordance with claim 11, said power output apparatus further comprising:

storage means for storing at least part of the regenerated electric power.

13. A power output apparatus in accordance with claim 10, said power output apparatus further comprising:

storage means for storing at least part of the regenerated electric power.

14. A power output apparatus for outputting power to a drive shaft, said power output apparatus comprising:

an engine having an output shaft;

a first motor comprising a first rotor connected with said output shaft of said engine and a second rotor connected with said drive shaft, said second rotor being coaxial to and rotatable relative to said first rotor, said first and second rotors being electromagnetically coupled with each other, whereby power is transmitted between said output shaft of said engine and said drive shaft via the electromagnetic coupling of said first and second rotors;

first motor-driving means for exchanging electric currents with said first motor to vary the electromagnetic coupling of said first rotor with said second rotor;

a second motor comprising a stator and a third rotor connected with said output shaft of said engine, said stator being electromagnetically coupled with said third rotor;

second motor-driving means for exchanging electric currents with said second motor to vary the electromagnetic coupling of said stator with said third rotor; and control means for controlling said first motor-driving means to enable said first motor to regenerate electric power, and controlling said second motor-driving means to enable said second motor to regenerate electric power.

15. A power output apparatus in accordance with claim 14, wherein said third rotor is mounted on said first rotor connected with said output shaft of said engine.

16. A power output apparatus in accordance with claim 15, said power output apparatus further comprising:

storage means for storing at least part of the regenerated electric power.

17. A power output apparatus in accordance with claim 14, said power output apparatus further comprising:

storage means for storing at least part of the regenerated electric power.

18. A power output apparatus for outputting mechanical energy as power to a drive shaft, said power output apparatus comprising:

an engine connected with a rotating shaft;

a first motor connected with said rotating shaft; and a second motor connected with said drive shaft;

wherein said engine produces mechanical energy and transmits the mechanical energy to said rotating shaft;

said first motor converts part of the mechanical energy transmitted via said rotating shaft to electrical energy and transmits the remainder of the mechanical energy to said second motor; and said second motor converts part of the remaining mechanical energy transmitted from said first motor to electrical energy and outputs the remainder of the mechanical energy to said drive shaft.

19. A power output apparatus in accordance with claim 18, said power output apparatus further comprising:

storage means for storing at least part of the converted electrical energy.

20. A power output apparatus for outputting power to a drive shaft, said power output apparatus comprising:

an engine having an output shaft and applying said first torque to said output shaft;

a motor comprising a first rotor connected with said output shaft of said engine and a second rotor connected with said drive shaft, said second rotor being coaxial to and rotatable relative to said first rotor, said first and second rotors being electromagnetically coupled with each other, whereby power is transmitted between said output shaft of said engine and said drive shaft via the electromagnetic coupling of said first and second rotors;

motor-driving means for exchanging electric currents with said first motor to vary the electromagnetic coupling of said first rotor with said second rotor; and control means for controlling said motor-driving means to enable said motor to apply a second torque, which is greater than said first torque and acts in the reverse of said first torque, to said output shaft of said engine.

21. A power output apparatus in accordance with claim 20, wherein said control means further comprises means for determining whether the control of said motor-driving means is to be continued or terminated, based on a revolving speed of said output shaft of said engine.

22. A power output apparatus in accordance with claim 20, said power output apparatus further comprising:

means for increasing a revolving speed of said output shaft of said engine; and means for enabling said control means to carry out said control of said motor-driving means after said revolving speed of said output shaft of said engine has increased above a predetermined level.

23. A power output apparatus for outputting power to a drive shaft, said power output apparatus comprising:

an engine having an output shaft and applying said first torque to said output shaft;

a first motor comprising a first rotor connected with said output shaft of said engine and a second rotor connected with said drive shaft, said second rotor being coaxial to and rotatable relative to said first rotor, said first and second rotors being electromagnetically coupled with each other, whereby power is transmitted between said output shaft of said engine and said drive shaft via the electromagnetic coupling of said first and second rotors;

motor-driving means for exchanging electric currents with said first motor to vary the electromagnetic coupling of said first rotor with said second rotor;

a second motor comprising a stator and a third rotor connected with said output shaft of said engine, said second motor applying said second torque to said output shaft; and control means for controlling said motor-driving means to enable said first motor to apply a third torque, which is greater than the sum of said first torque and said second torque and acts in the reverse of said first torque, to said output shaft of said engine.

24. A power output apparatus in accordance with claim 23, wherein said third rotor is mounted on said first rotor connected with said output shaft of said engine.

25. A power output apparatus for outputting power to a drive shaft, said power output apparatus comprising:

an engine having an output shaft;

a motor comprising a first rotor connected with said output shaft of said engine and a second rotor connected with said drive shaft, said second rotor being coaxial to and rotatable relative to said first rotor, said first and second rotors being electromagnetically coupled with each other, such that power is transmitted between said output shaft of said engine and said drive shaft via the electromagnetic coupling of said first and second rotors;

motor-driving means for exchanging electric currents with said motor to vary the electromagnetic coupling of said first rotor with said second rotor; and control means for controlling said motor-driving means to enable said motor to apply a torque to said output shaft, in order to make a sum of torques applied to said output shaft of said engine act in the reverse of rotation of said output shaft.

26. A method of controlling a power output apparatus for outputting power to a drive shaft, wherein said power output apparatus includes an engine having an output shaft; and a motor comprising a first rotor connected with said output shaft of said engine and a second rotor connected with said drive shaft, said second rotor being coaxial to and rotatable relative to said first rotor, said first and second rotors being electromagnetically coupled with each other, such that power is transmitted between said output shaft of said engine and said drive shaft via the electromagnetic coupling of said first and second rotors; and said method comprising the steps of:

(a) operating said engine to apply a first torque to said output shaft, and (b) applying a second torque with said motor to said output shaft of said engine, with said second torque being greater than said first torque and acting in the reverse of said first torque.

* * * * *